(12) United States Patent
Pon

(10) Patent No.: US 6,414,987 B1
(45) Date of Patent: *Jul. 2, 2002

(54) CODE MULTIPATH ESTIMATION FOR WEIGHTED OR MODIFIED TRACKING

(75) Inventor: Rayman W. Pon, Cupertino, CA (US)

(73) Assignee: Trimble Navigation, Ltd., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/234,799

(22) Filed: Jan. 19, 1999

Related U.S. Application Data

(63) Continuation of application No. 08/833,183, filed on Apr. 4, 1997, now Pat. No. 5,917,866.

(51) Int. Cl.[7] .............................. A61F 2/06; H04L 27/30
(52) U.S. Cl. ....................... 375/148; 375/150; 375/149; 375/347; 375/343
(58) Field of Search ................................ 375/347, 148, 375/149, 150, 343, 346, 285

(56) References Cited

U.S. PATENT DOCUMENTS

| | | | | |
|---|---|---|---|---|
| 4,829,543 A | * | 5/1989 | Borth et al. ................... 375/83 |
| 5,101,416 A | * | 3/1992 | Fenton et al. ................ 375/206 |
| 5,278,871 A | * | 1/1994 | Rasky et al. ................. 375/285 |
| 5,347,536 A | * | 9/1994 | Meehan ....................... 375/200 |
| 5,414,729 A | * | 5/1995 | Fenton ......................... 375/209 |
| 5,481,572 A | * | 1/1996 | Skold et al. ................. 375/347 |
| 5,487,091 A | * | 1/1996 | Jasper et al. ................ 375/347 |
| 5,493,588 A | * | 2/1996 | Lennen ....................... 375/343 |
| 5,530,716 A | * | 6/1996 | Lipa ............................ 375/206 |
| 5,692,008 A | * | 11/1997 | Van Nee ...................... 375/346 |
| 5,720,039 A | * | 2/1998 | Liberman et al. ........... 375/285 |
| 5,917,866 A | * | 6/1999 | Pon ............................. 375/346 |
| 5,966,403 A | * | 10/1999 | Pon ............................. 375/208 |

\* cited by examiner

*Primary Examiner*—Stephen Chin
*Assistant Examiner*—Heechul Kim
(74) *Attorney, Agent, or Firm*—Boris G. Tankhilevich

(57) ABSTRACT

The apparatus and method for estimation and minimization of the residual multipath error signal are disclosed. The reduction of the multipath error signal is achieved by using the weighted or modified tracking. The estimation and minimization of the reduced multipath error signals is achieved by using the generator of additional modified or weighted signals.

36 Claims, 21 Drawing Sheets

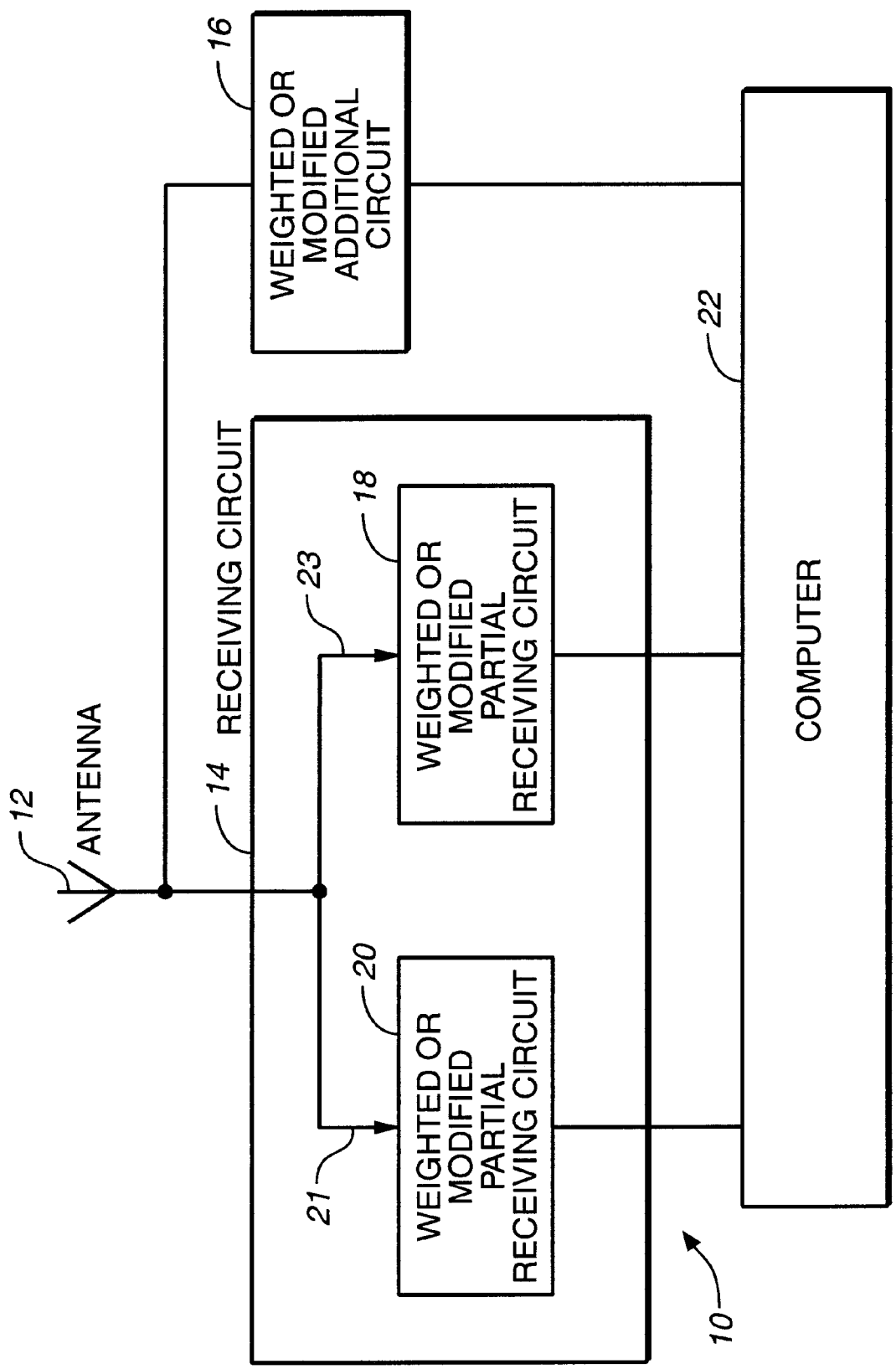
FIG._1

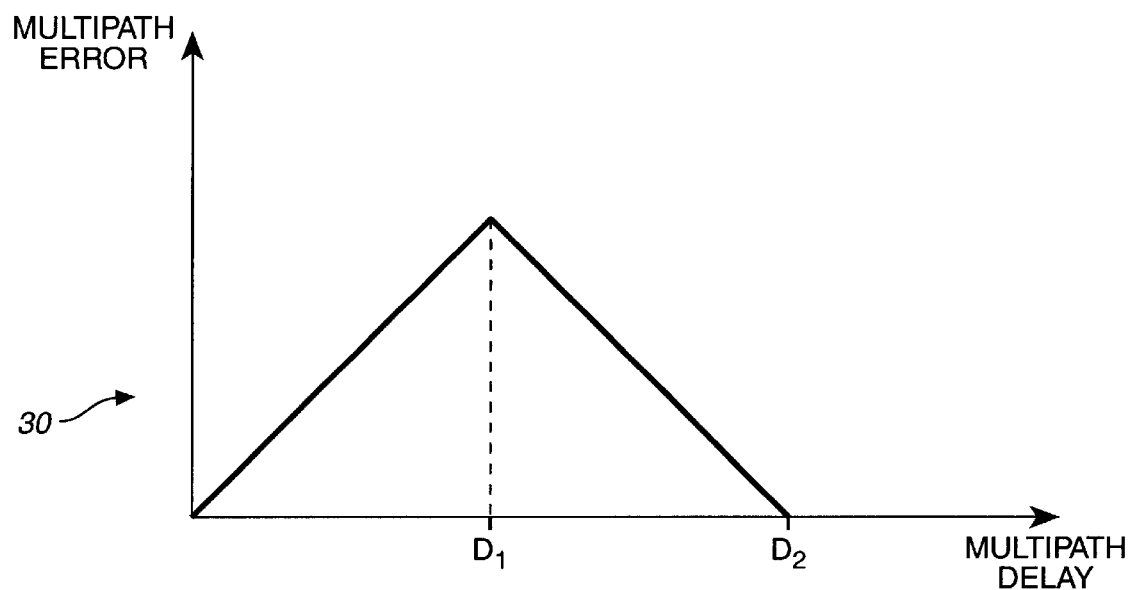
FIG._2
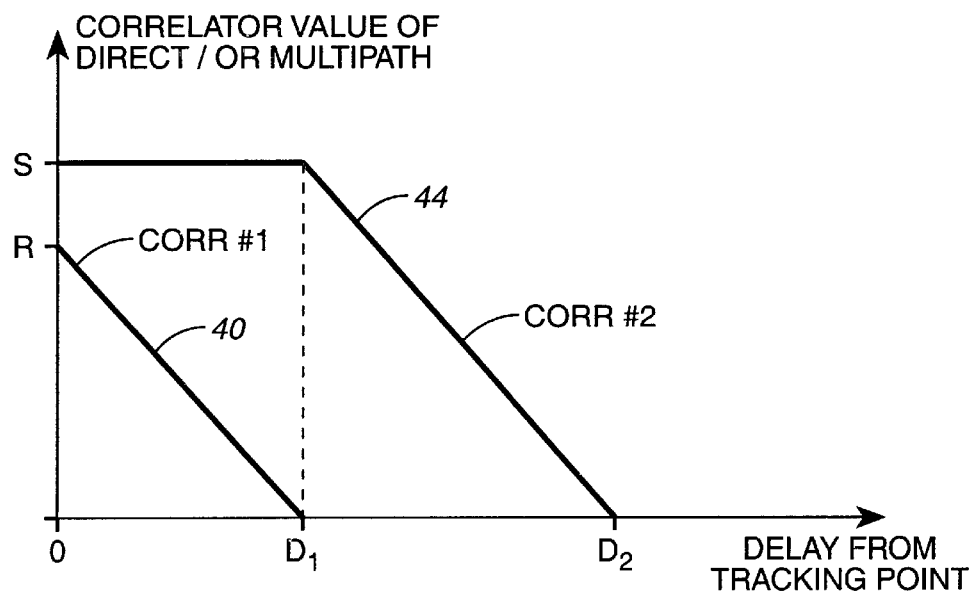
FIG._3

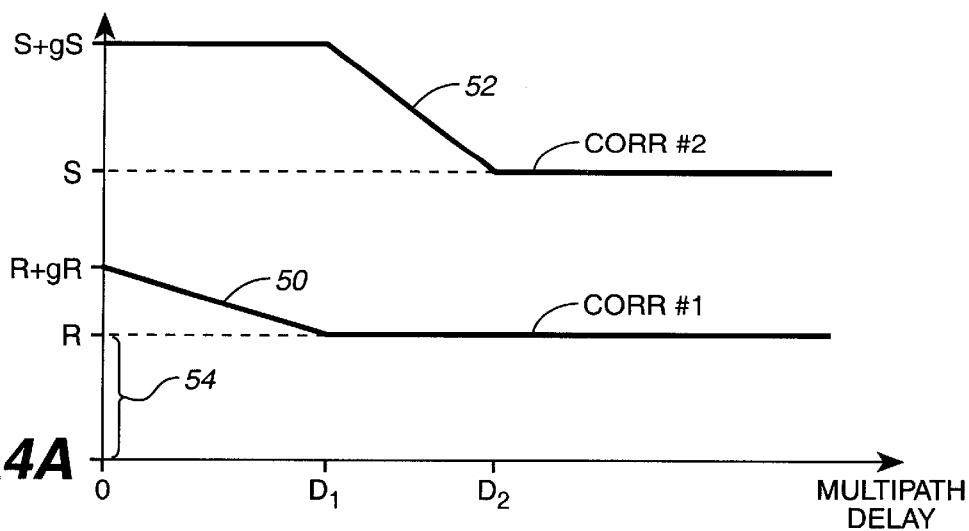
FIG._4A
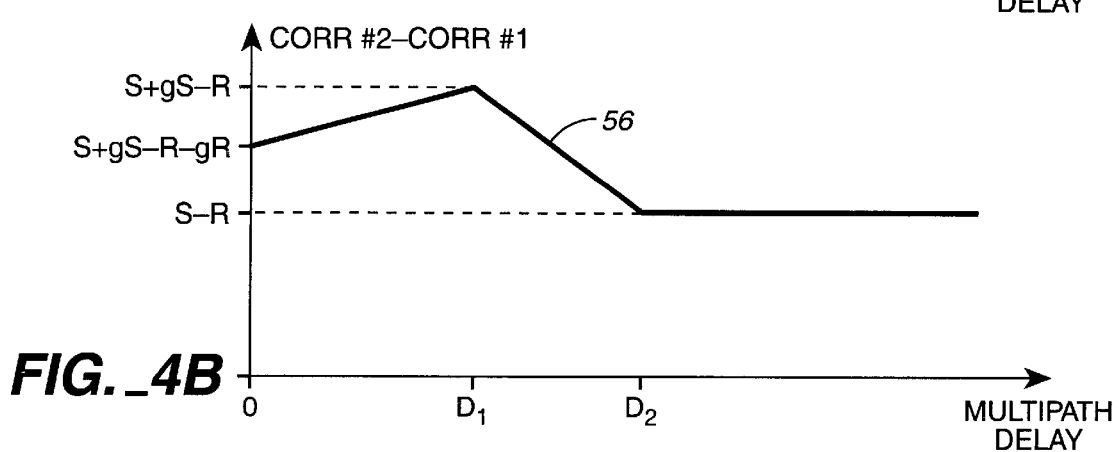
FIG._4B
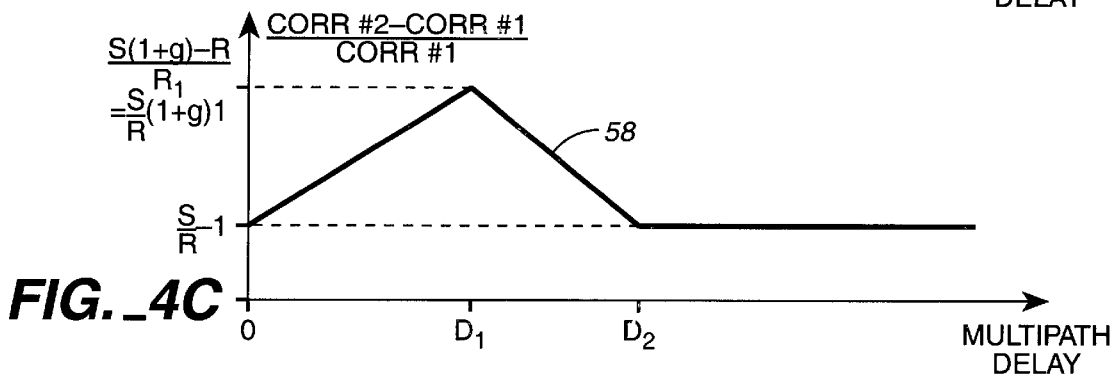
FIG._4C
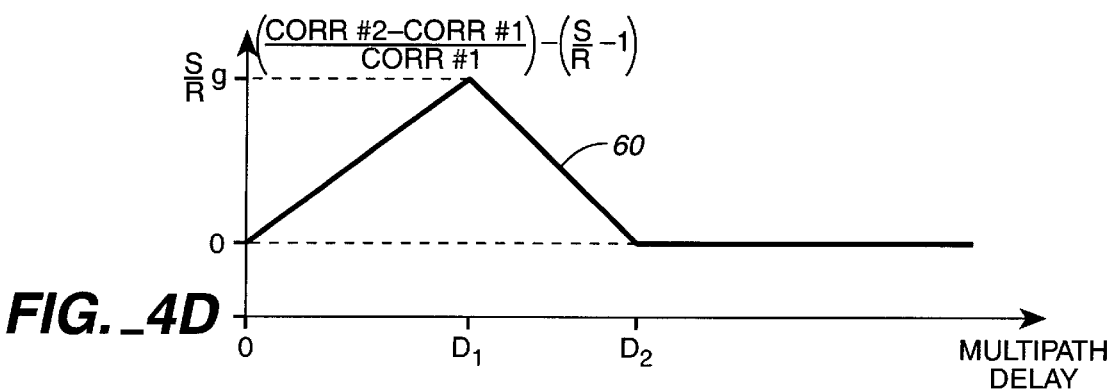
FIG._4D

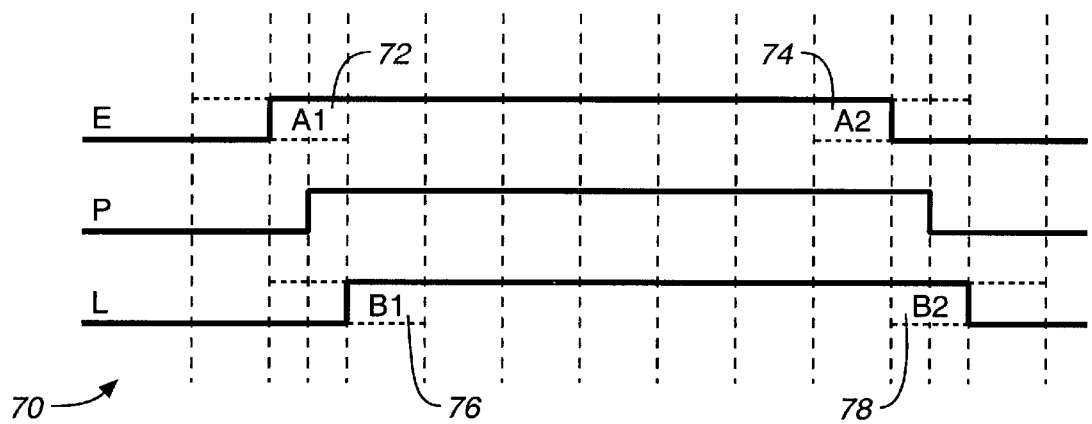
FIG._5
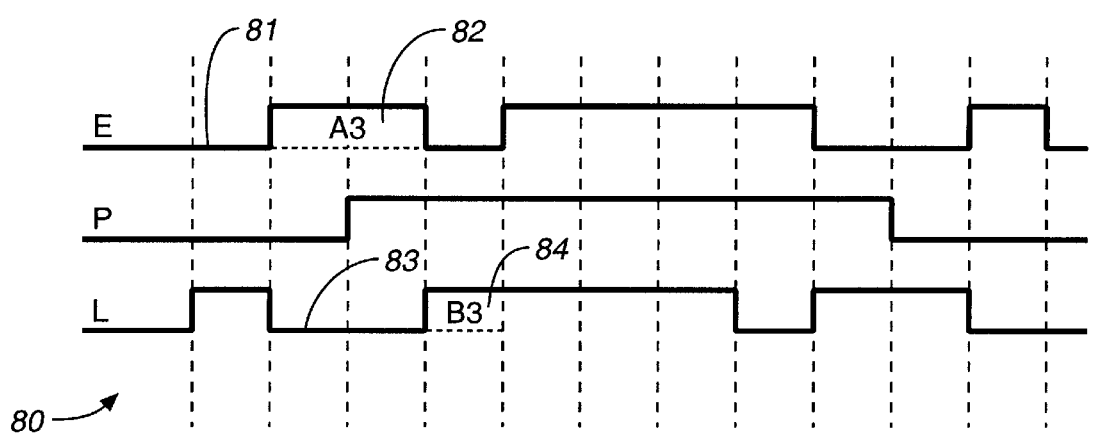
FIG._6
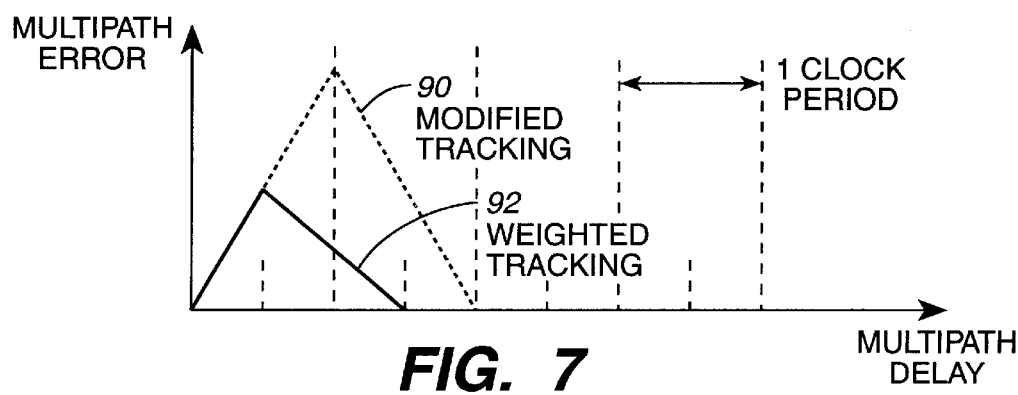
FIG. 7

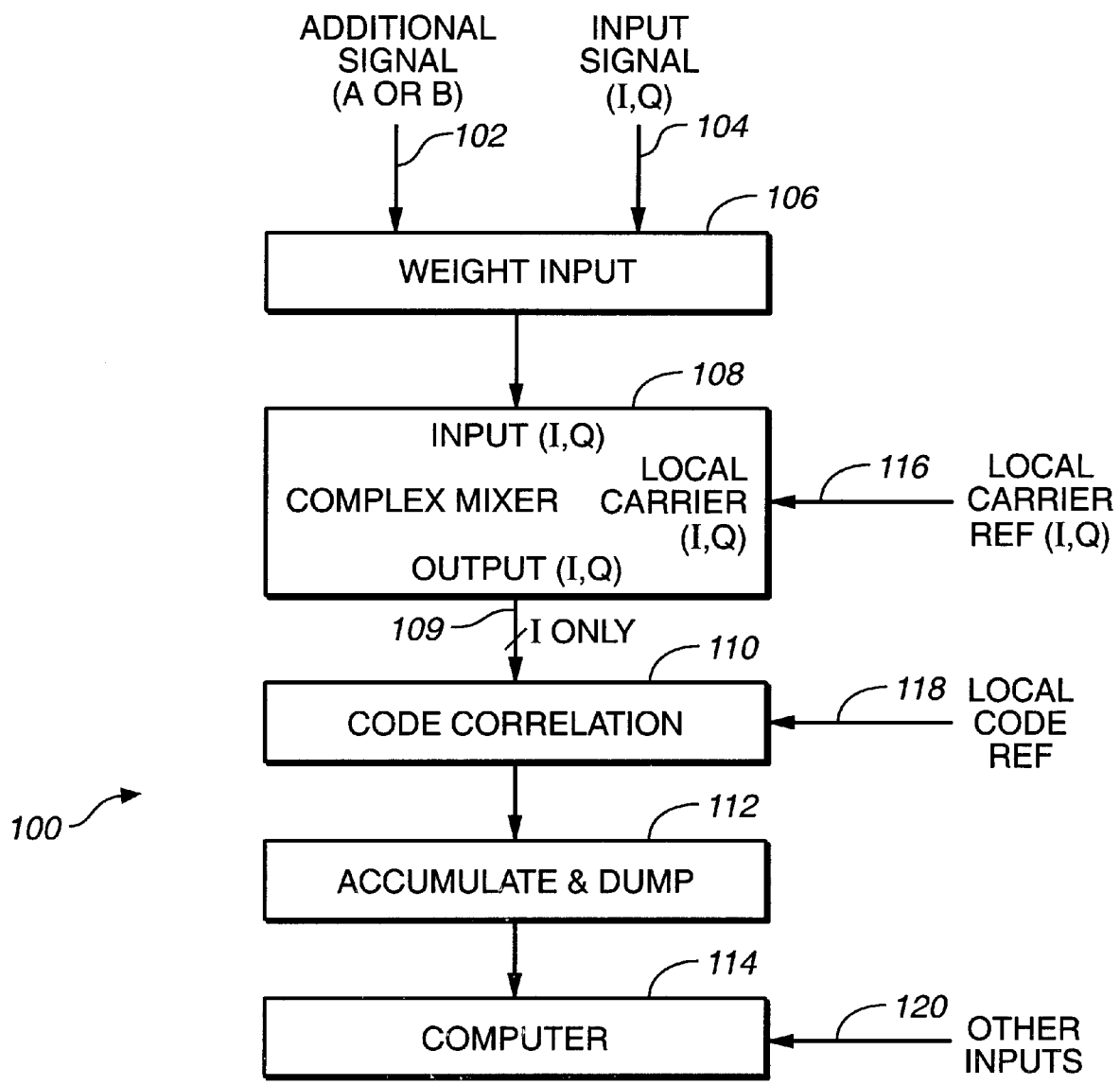
FIG._8

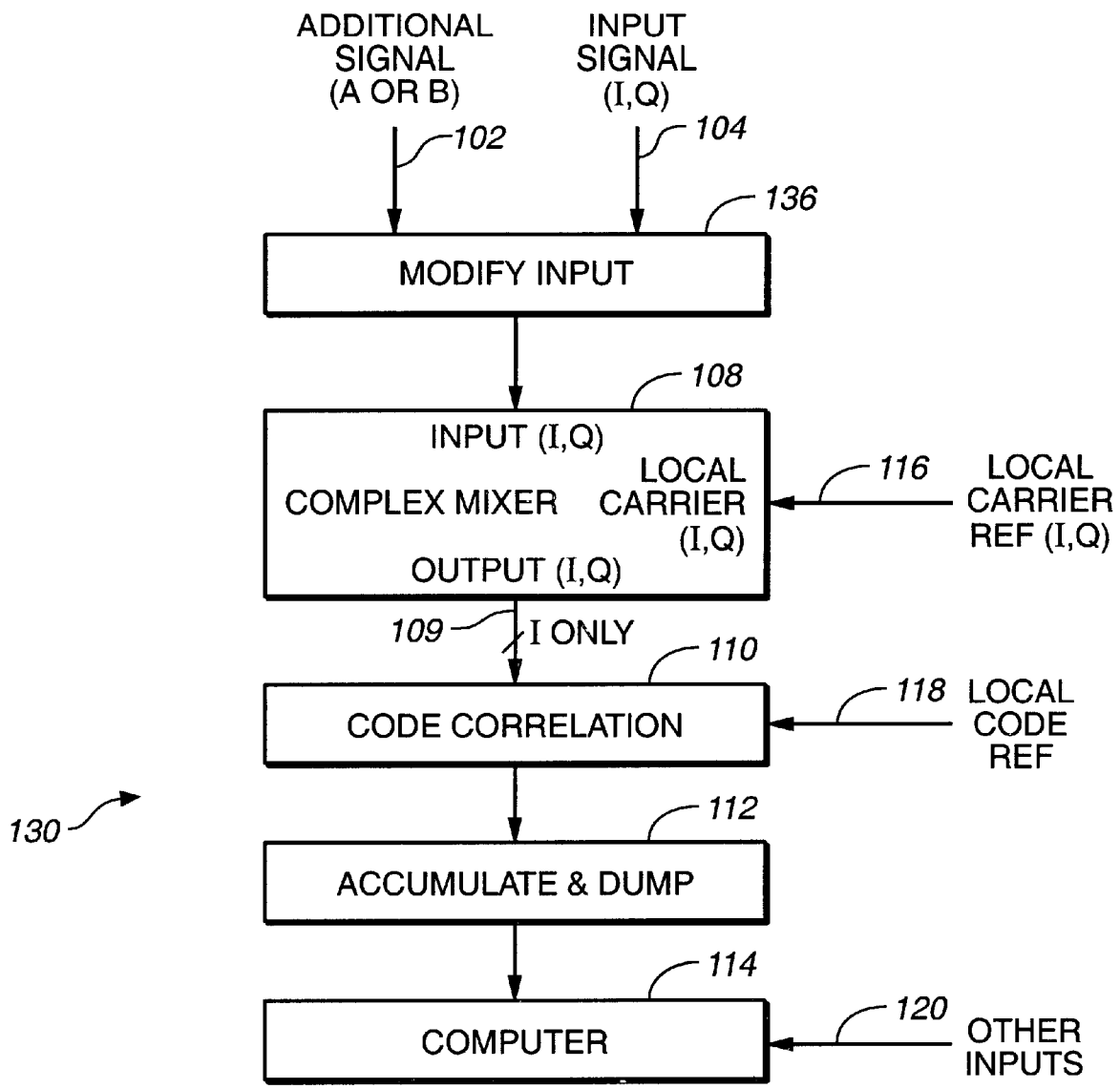
FIG._9

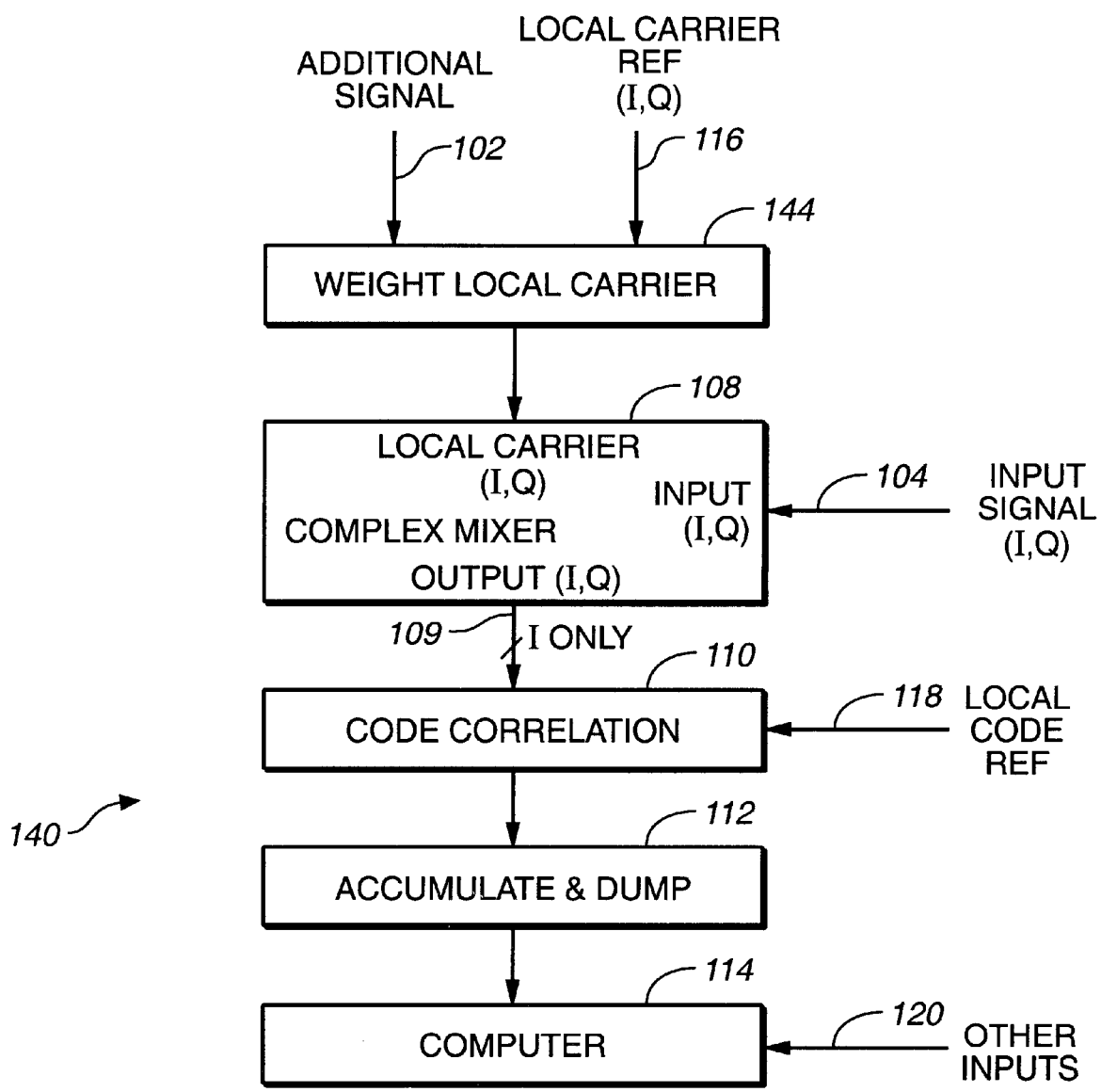
FIG._10

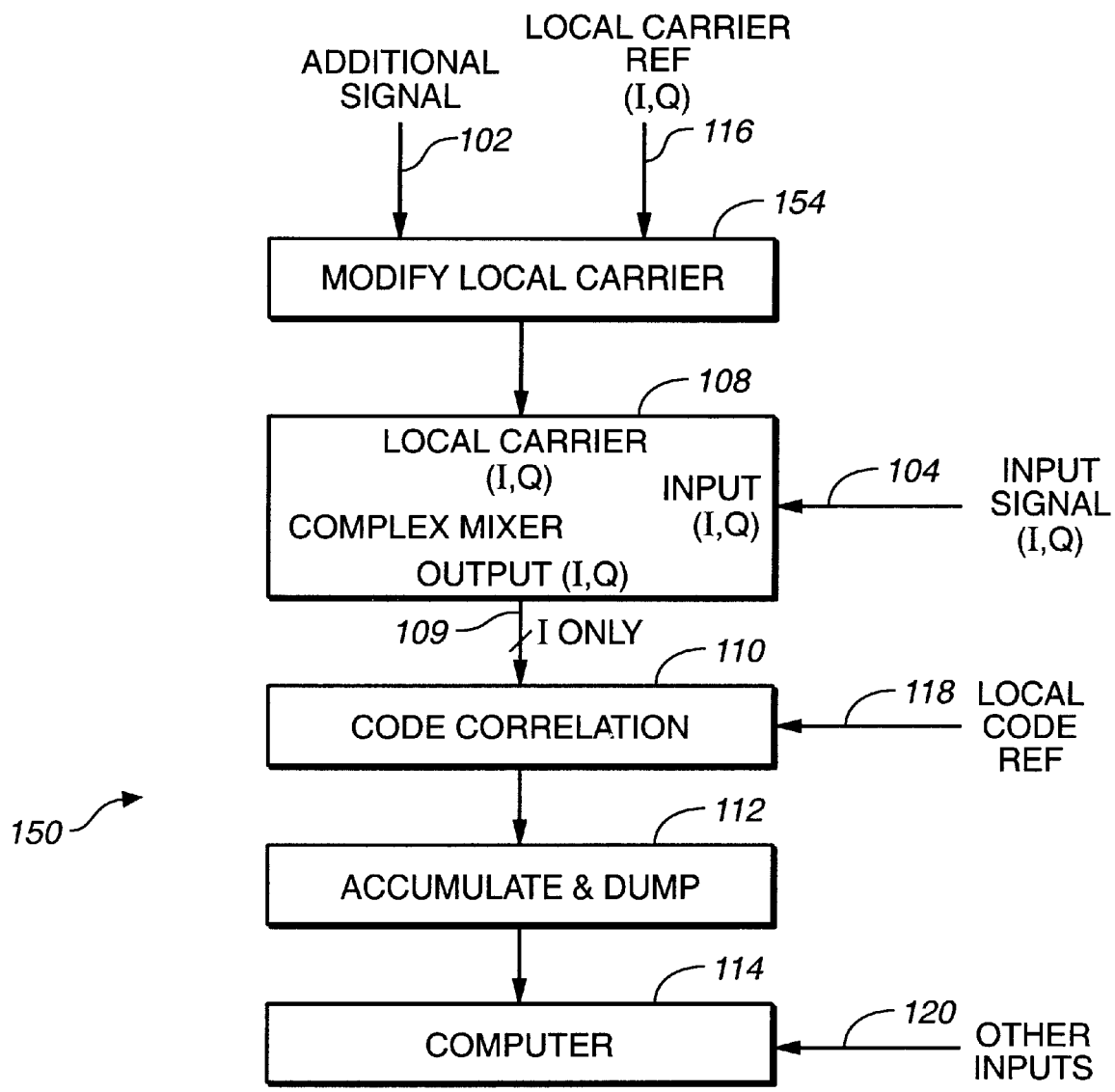
FIG._11

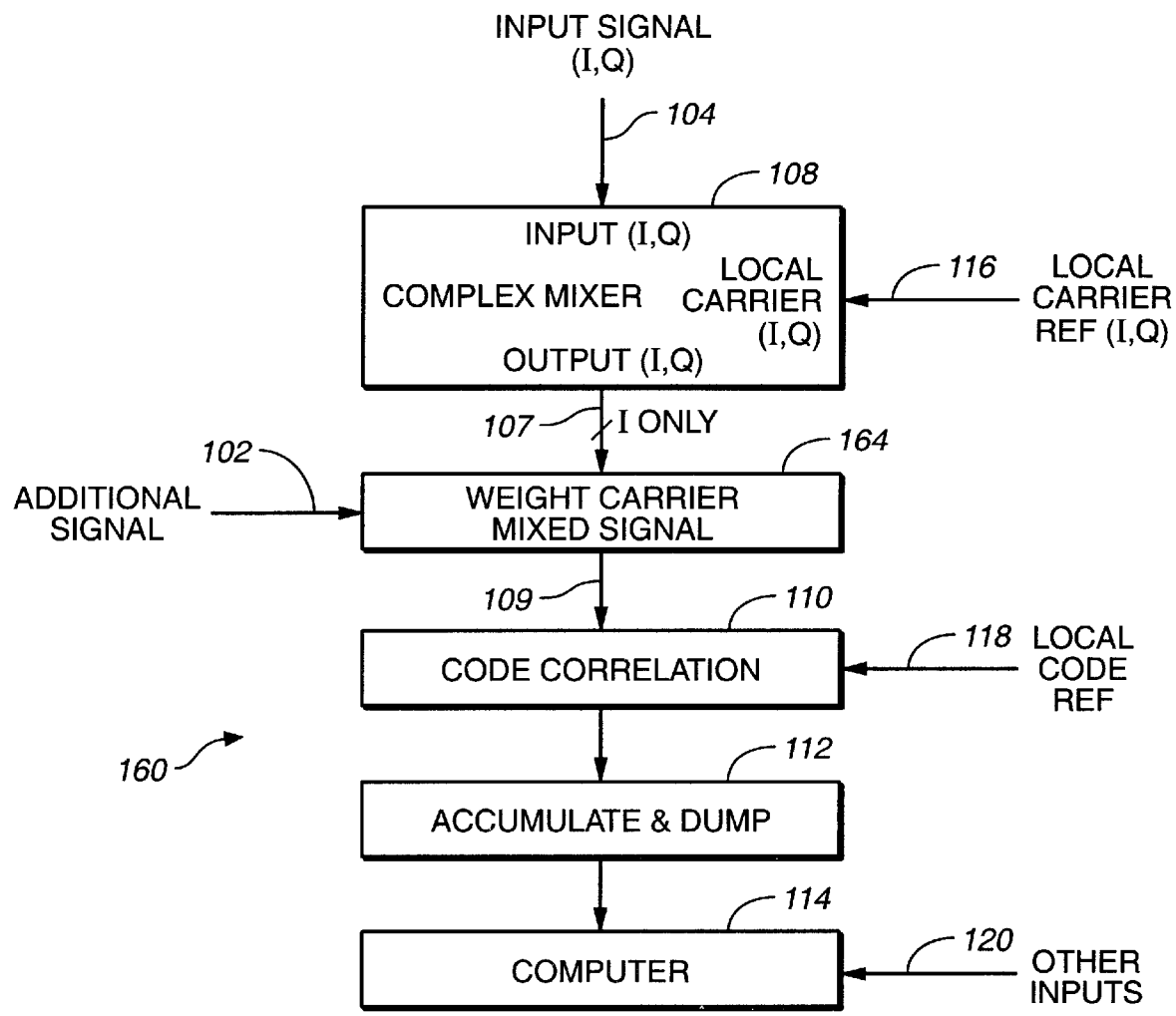
FIG._12

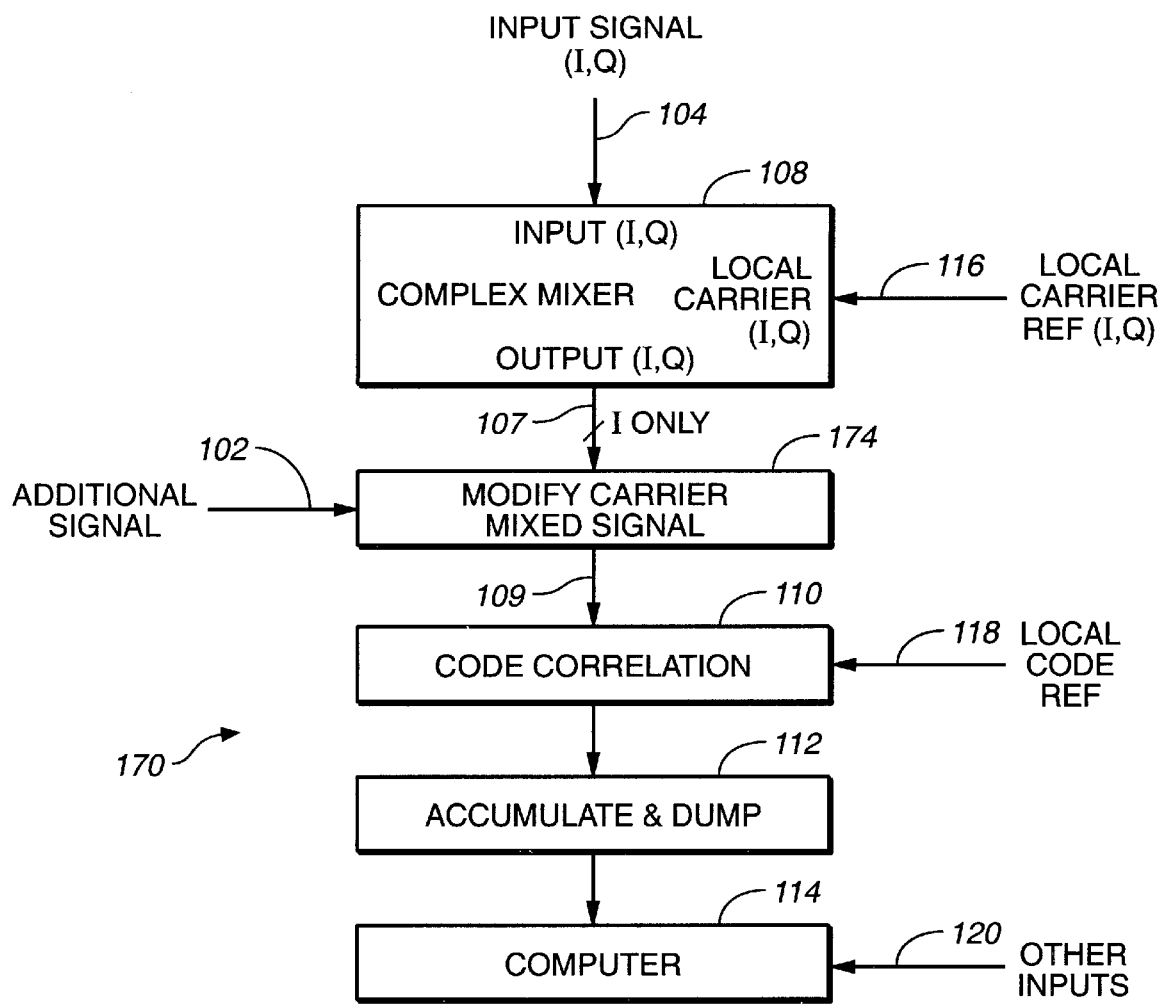
FIG._13

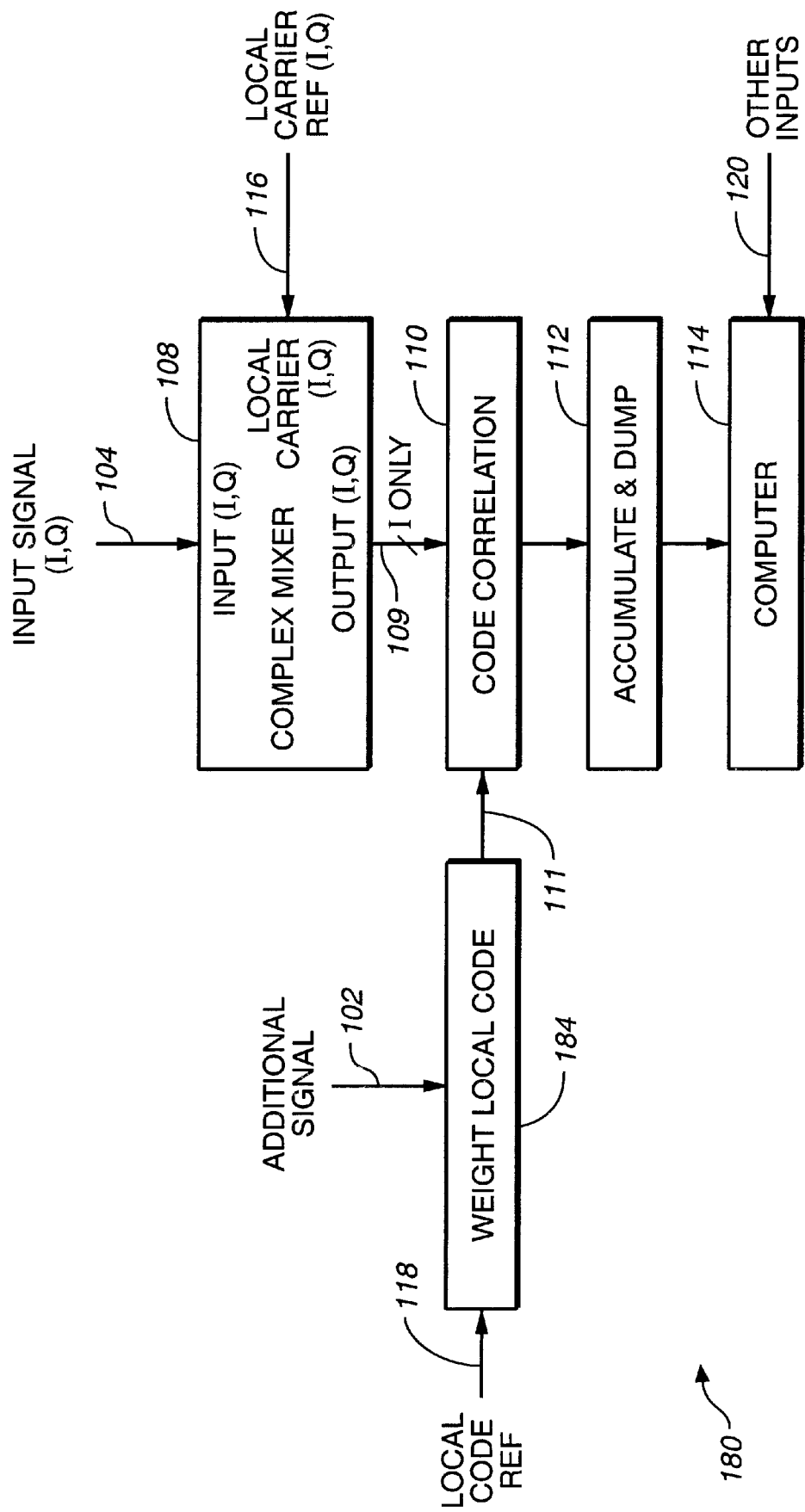
FIG._14

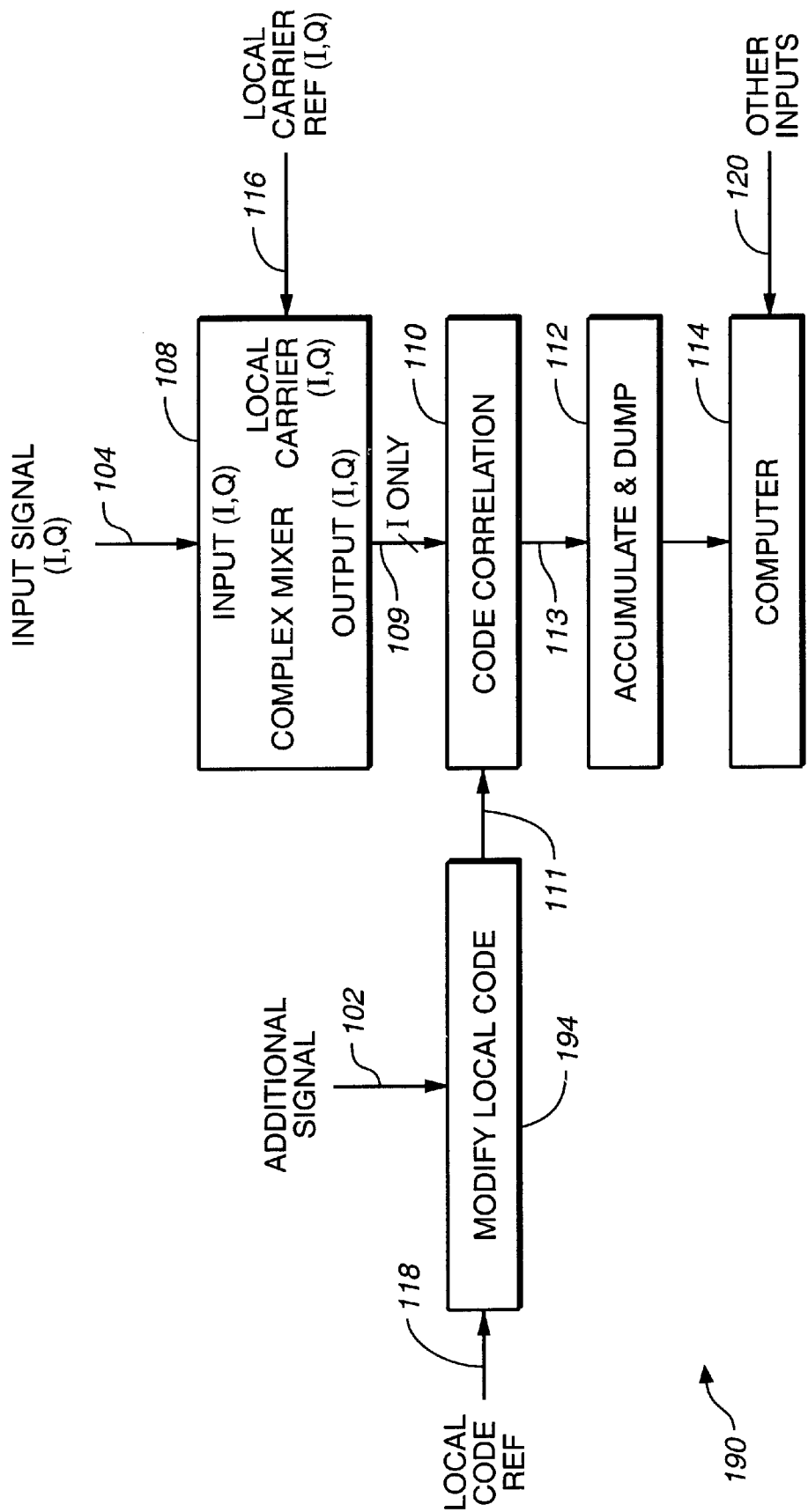
FIG._15

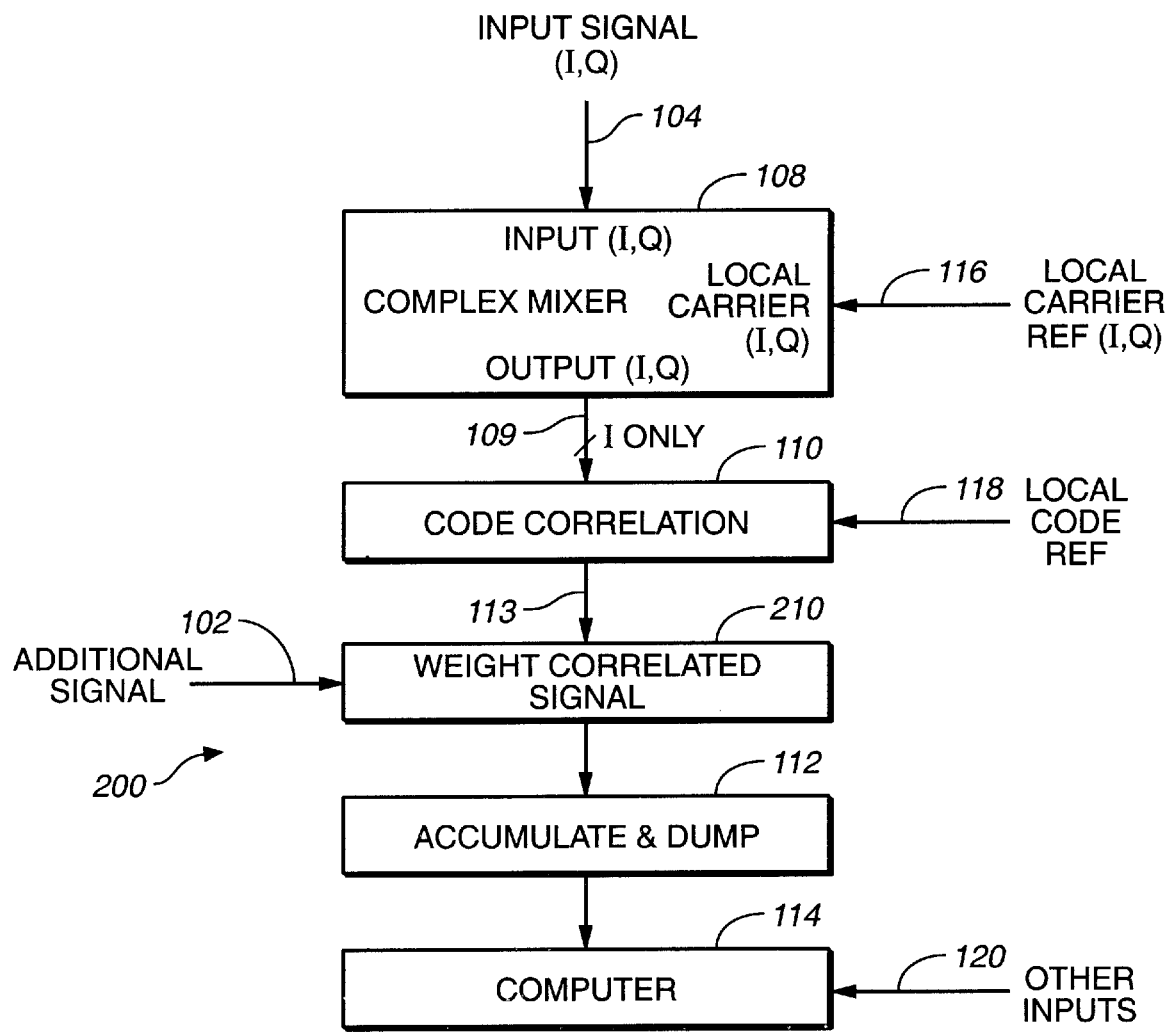
FIG._16

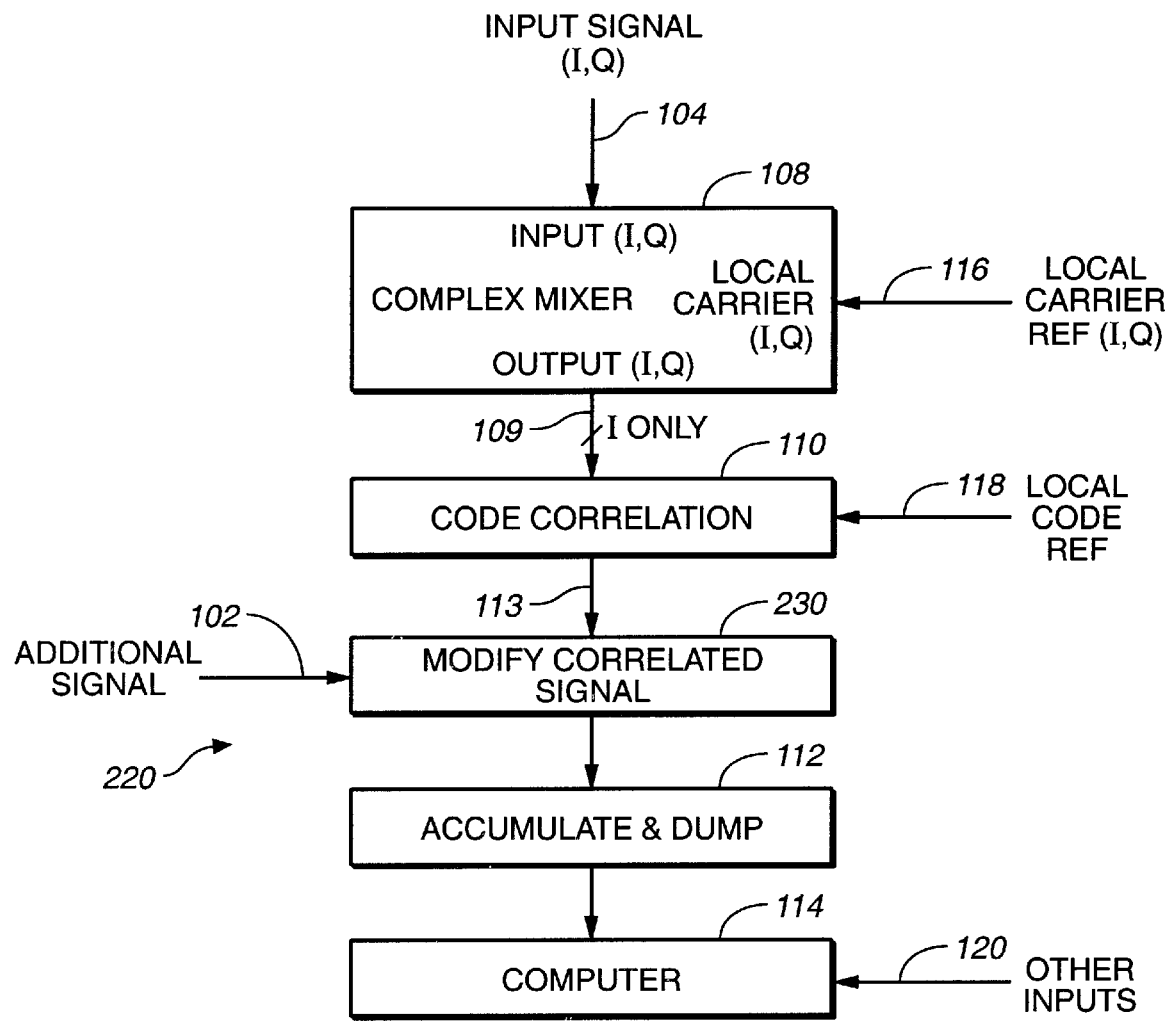
FIG._17

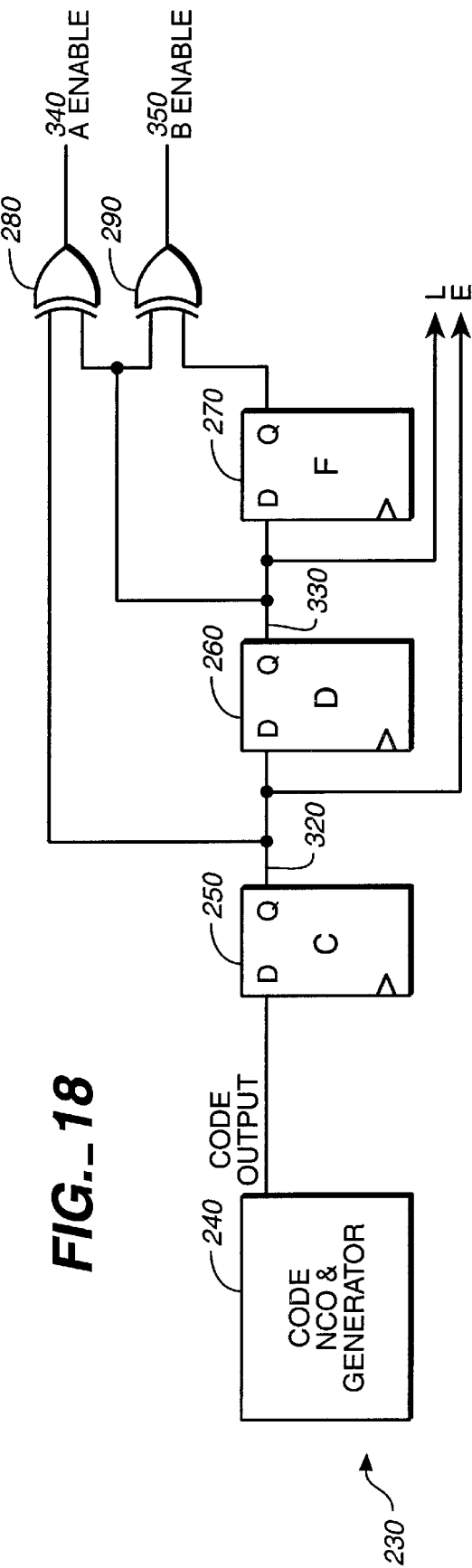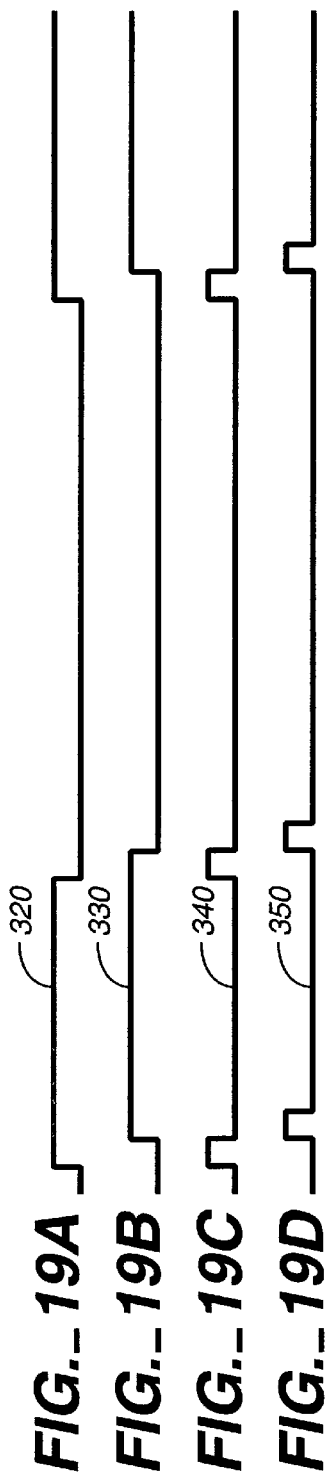

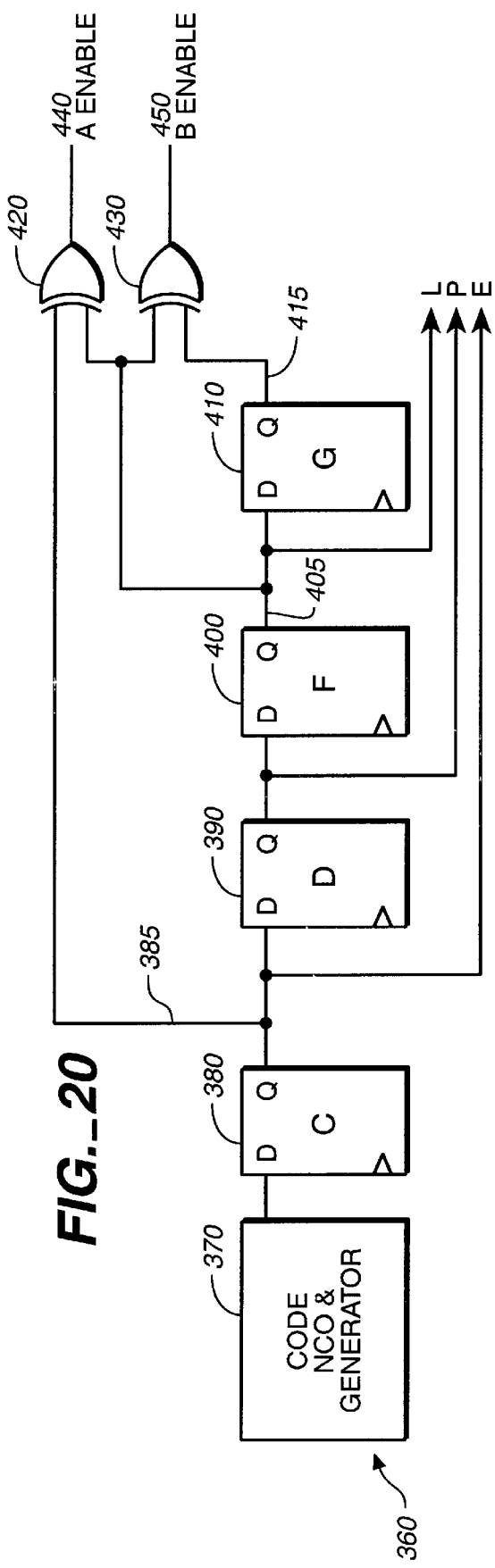
FIG._20
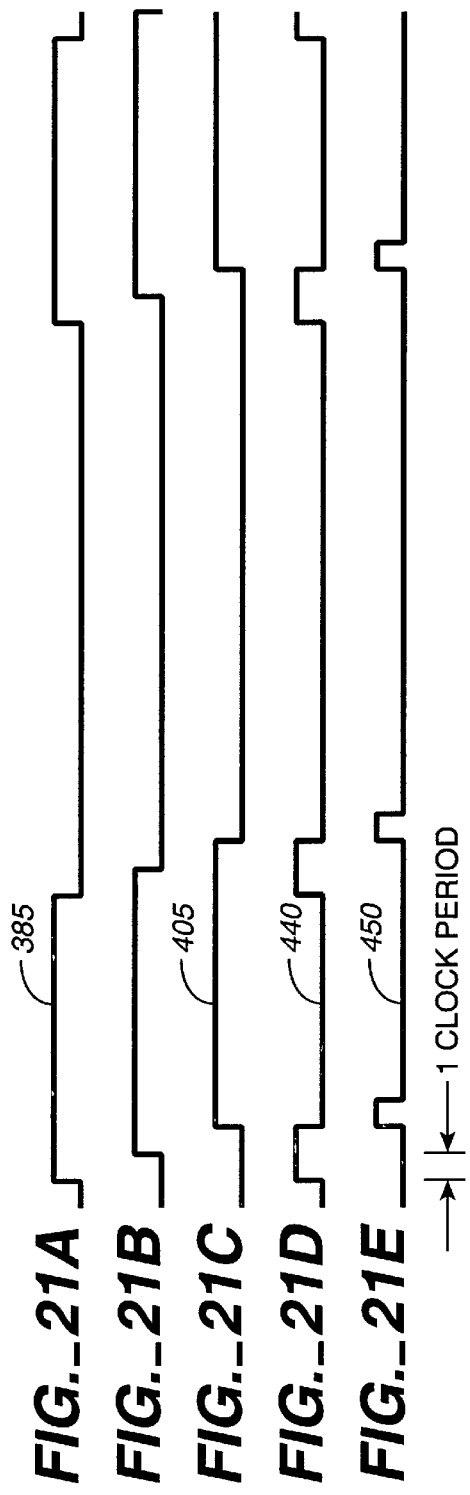
FIG._21A
FIG._21B
FIG._21C
FIG._21D
FIG._21E

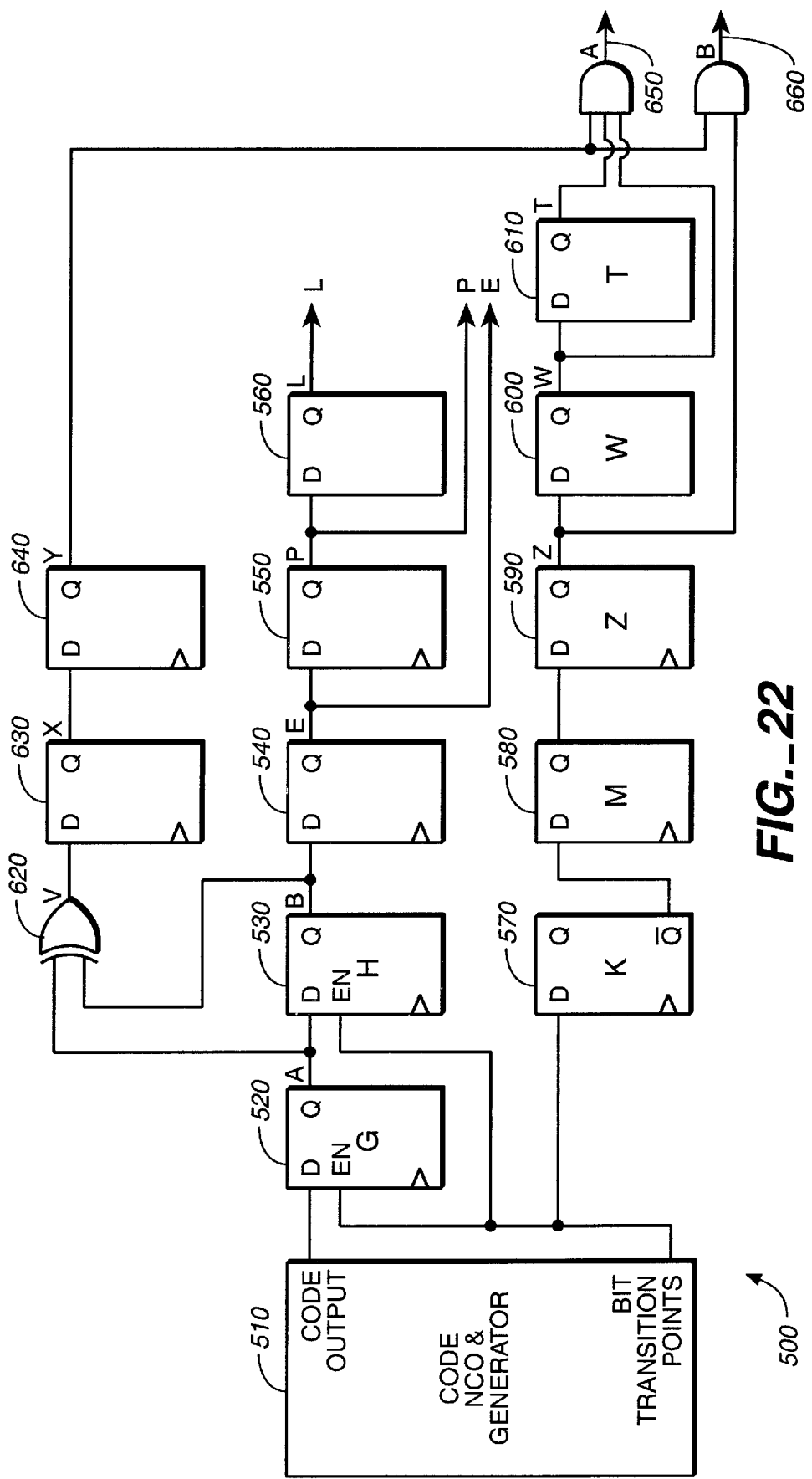
FIG._22

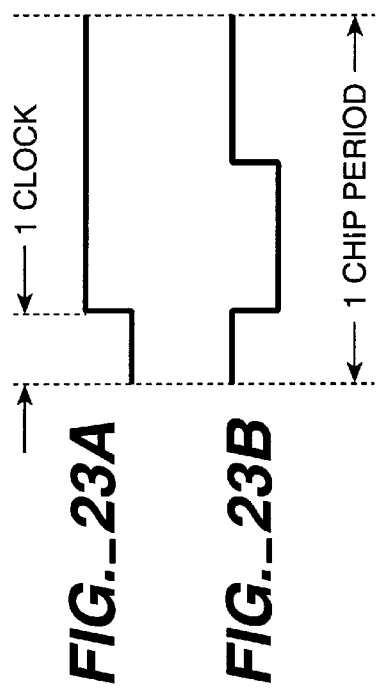
FIG._23A
FIG._23B
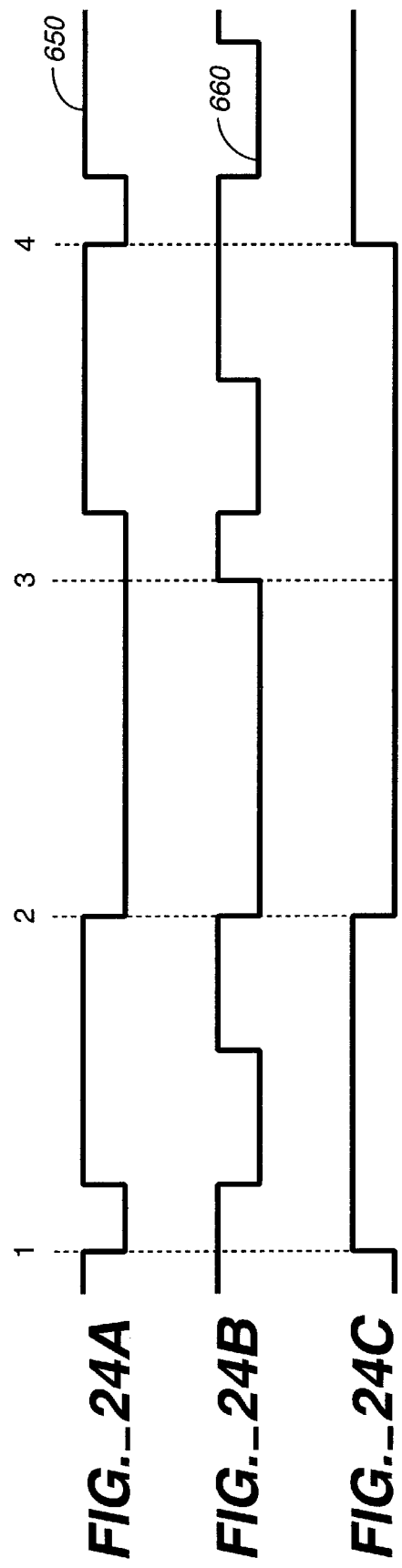
FIG._24A
FIG._24B
FIG._24C

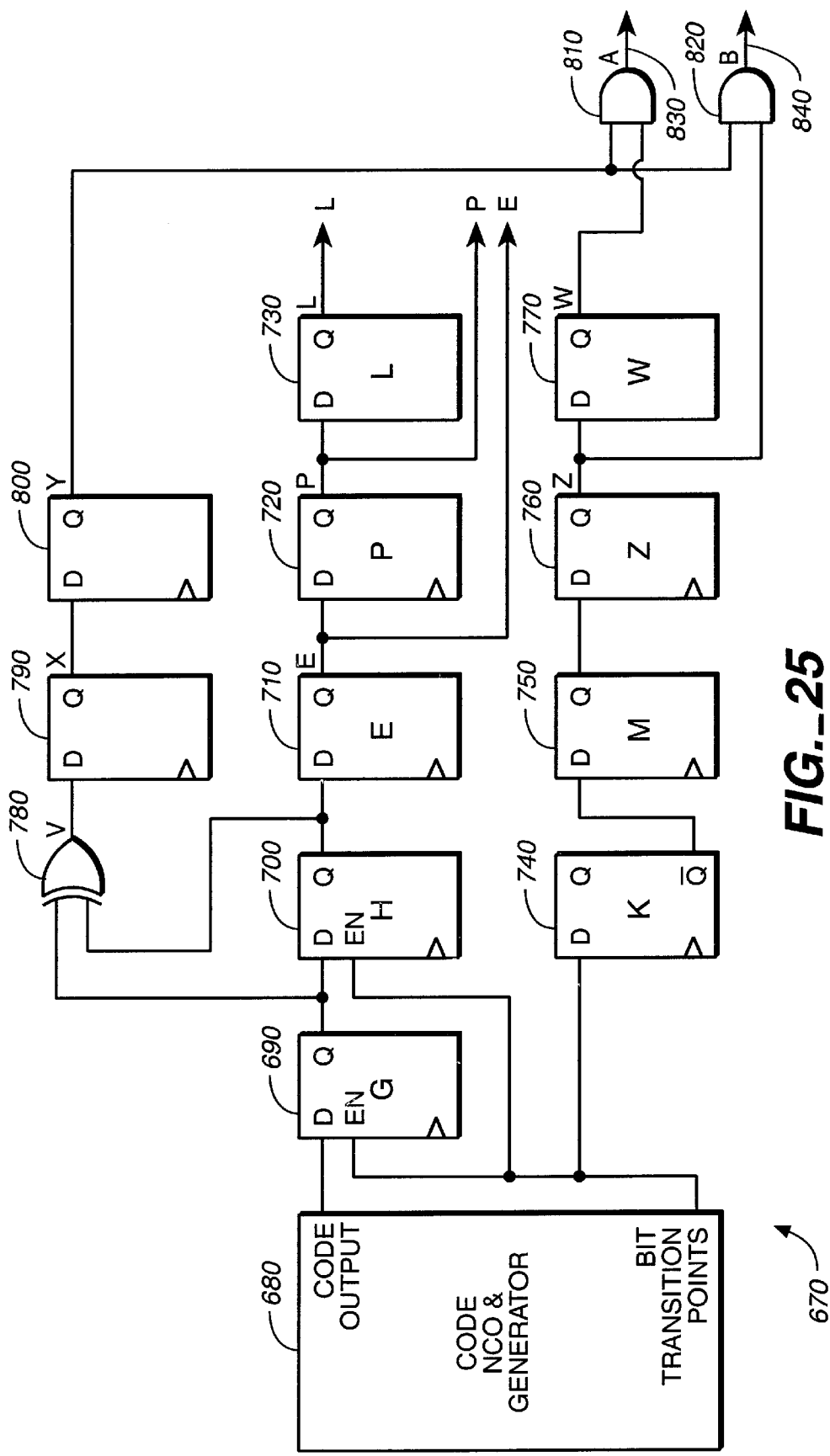
FIG._25

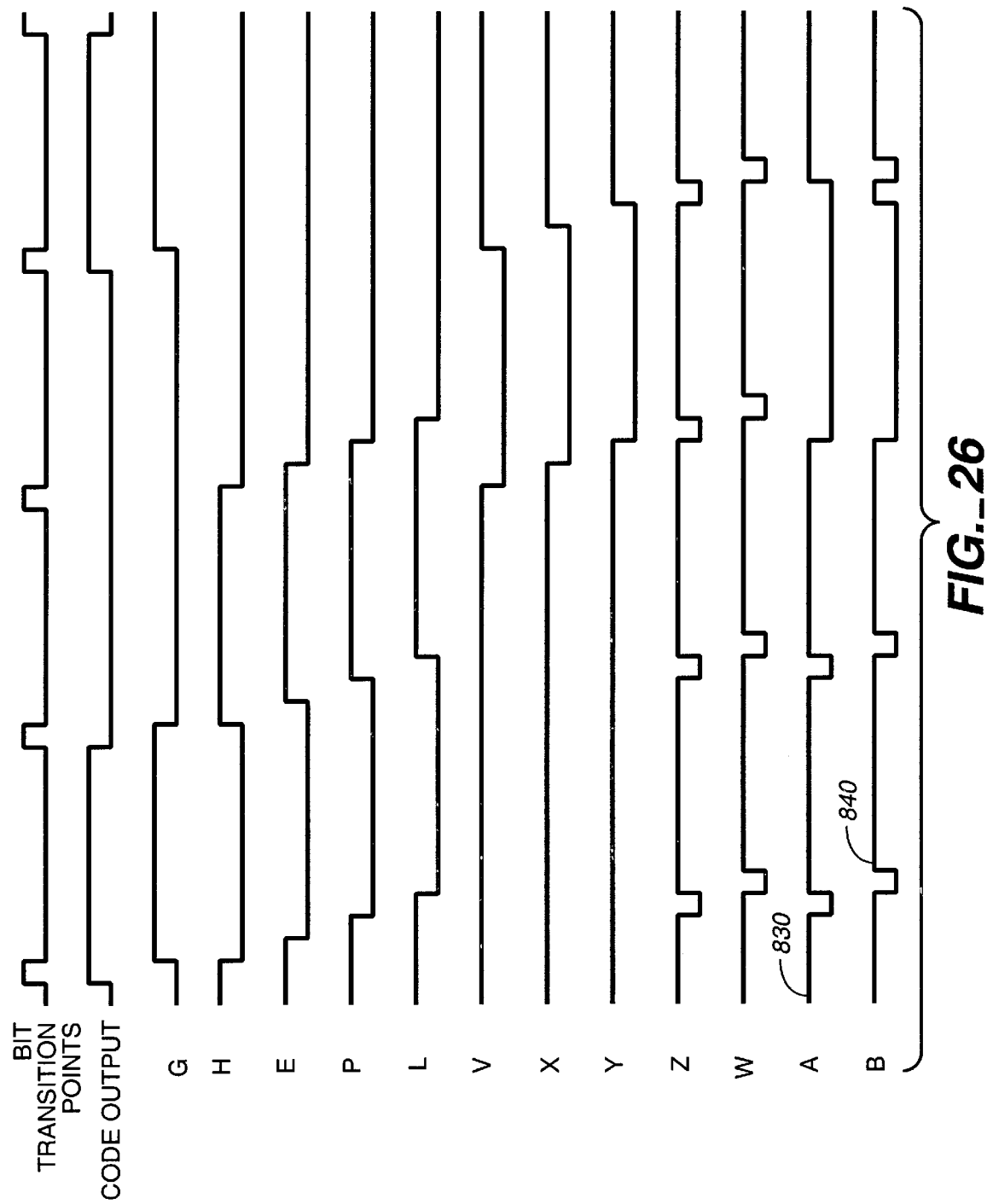
FIG._26

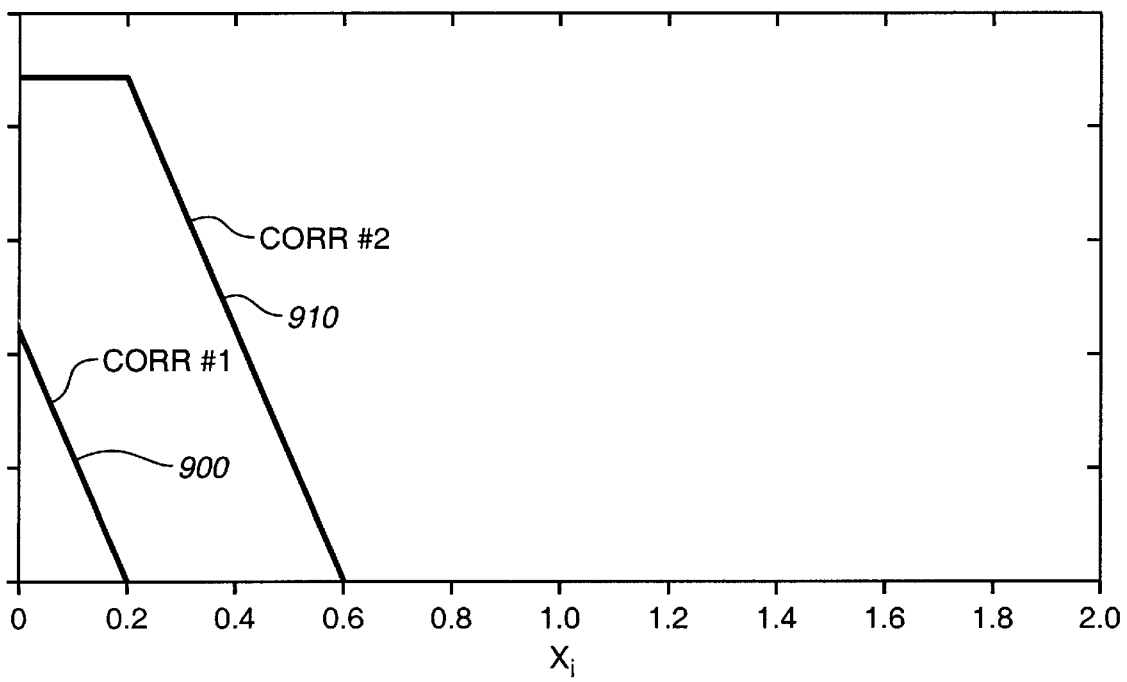
FIG._27
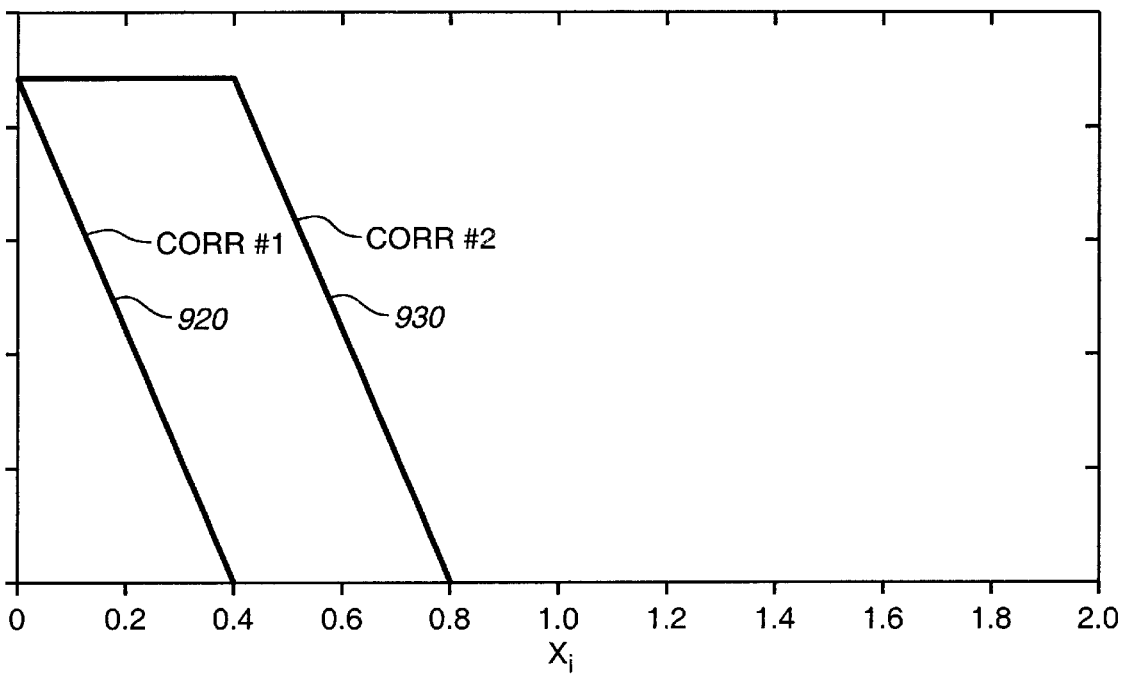
FIG._28

CODE MULTIPATH ESTIMATION FOR WEIGHTED OR MODIFIED TRACKING

This is a continuation for the U. S. patent application entitled "Code multipath estimation for weighted or modified tracking using weighted or modified correlations", Ser. No. 08/833,183, filed on Apr. 4, 1997 and now patented U.S. Pat. No. 5,917,866.

BACKGROUND

Reference to a Satellite Positioning System or SATPS herein refers to a Global Positioning System (GPS), to a Global Orbiting Navigation System (GLONASS), and to any other compatible satellite-based system that provides information by which an observer's position and the time of observation can be determined.

The Global Positioning System (GPS) is being developed and operated to support military navigation and timing needs at an estimated cost of about $8–10 billion. GPS represents an almost ideal dual-use technology and enjoys increased attention by civilians to explore its suitability for civil applications. The complete GPS system consists of 24 operational satellites and provides 24-hour, all-weather navigation and surveying capability worldwide. A major milestone in the development of GPS was achieved on Dec. 8, 1993, when the Initial Operational Capability (IOC) was declared as 24 satellites were successfully operating.

The implication of IOC is that commercial, national, and international civil users can rely on the availability of the Standard Positioning Service. Current policies quantify SPS as 100-meter, 95% position accuracy for a single user. Authorized (military) users will have access to the Precise Positioning Service (PPS), which provides a greater degree of accuracy. The PPS access is controlled by cryptographic means.

The GPS satellites transmit at frequencies L1=1575.42 MHz and L2=1227.6 MHz modulated with two types of codes and with a navigation message. The two types of codes are the C/A-code and the P-code. SPS is based on the C/A-code, whereas PPS is provided by the P-code portion of the GPS signal. The current authorized level of SPS follows from an intentional degradation of the full C/A-code capability. This measure is called selective availability (SA) and includes falsification of the satellite clock (SA-dither) and the broadcast satellite ephemeris (SA-epsilon), which is part of the navigation message. Despite selective availability, the C/A-code is fully accessible by civilians. On Jan. 31, 1994 the SA was finally implemented. The purpose of SA is to make the P-codes available only to authorized and military users. Users should be equipped with a decryption device or the "key" in order to lock on to P-codes. SA is implemented through a modification of the mathematical formula of the P-code using a classified rule. The encrypted P-code is referred to as the Y-code.

Two types of observables are of interest to users. One is the pseudo-range, which equals the distance between the satellite and the receiver plus small corrective terms due to clock errors, the ionosphere, the troposphere, and the multipath. Given the geometric positions of the satellites (satellite ephemeris), four pseudo-ranges are sufficient to compute the position of the receiver and its clock error. Pseudo-ranges are a measure of the travel time of the codes (C/A, P, or Y).

The second observable, the carrier phase, is the difference between the received phase and the phase of the receiver oscillator at the epoch of measurement. Receivers are programmed to make phase observations at the same equally spaced epochs. The receivers also keep track of the number of complete cycles received since the beginning of a measurement. Thus, the actual output is the accumulated phase observable at preset epochs.

(The above-referenced discussion is provided in the book "GPS Satellite Surveying", Second Edition, authored by Alfred Leick, and published by John Wiley & Sons, Inc. in 1995; pp 1–3).

Both the SPS and PPS address "classical" navigation, where just one receiver observes the satellites to determine its geocentric position. Typically, a position is computed for every epoch of observation.

However, in the surveying and geodesy applications the relative or differential positioning is used, wherein the relative location between the receivers is determined. In this case, many of the common mode errors cancel or their impact is significantly reduced. This is particularly important in the presence of selective availability.

The multipath errors originate with contamination of SATPS signals by delayed versions of these signals. For some applications using either pseudo-range carrier phase observables, multipath is the dominant error source. The most direct approach for reducing this error is to select an antenna site distant from reflecting objects, and to design antenna/back plane combinations to further isolate the antenna from its surroundings. In some cases, however, antennas should be located in relatively poor sites, and other techniques for code multipath reduction are required.

In the U.S. Pat. No. 5,414,729, issued to Fenton, a receiver for pseudorandom noise (PRN) encoded signals is disclosed.

The Fenton receiver consists of a sampling circuit, multiple carrier and code synchronizing circuits, and multiple correlators, with each correlator having a selectable code delay spacing. The time delay spacing of the multiple correlators is distributed around an expected correlation peak to produce an estimate of the correlation function parameters which vary with respect to multipath distortion. This information may be used in turn to determine the offset estimates for locally generated PRN reference code and carrier phase tracking signals", Col. 3, lines 21–36. In another embodiment of the Fenton device, "the majority of the channels in a receiver can be left to operate normally, with one or more of the channels being dedicated to continuously sequencing from channel to channel to determine the multipath parameters for a partial PRN code being tracked", Col. 3, lines 44–49.

Thus, the Fenton device includes a plurality of tracking satellite channels used to estimate the multipath parameters.

However, the Fenton device '729 includes a number of limitations.

(1) The Fenton device does only tracking. After tracking, there is still a multipath blimp left in the correlation function that has to be removed by some other means.

(2) The Fenton device uses the full correlation. Indeed, the Fenton device correlates through the entire chip period.

(3) The Fenton device employs multiple correlators time delay spacing. This is equivalent to Early minus Late (E–L) response function that is limited to one chip time period. That is, the Fenton device is a "narrow correlator" device. If Fenton's (E–L) response function is not limited to only one chip time period and is extended over two chip periods, the Fenton device would not be beneficial over the prior art at all.

(4) Using the filter function approach, the "narrow correlator" property of the Fenton device can be described as follows: the amplitude of the Fenton's filter function decreases when time increases between zero and two chip time periods.

Another technique for code multipath reduction, that is free of Fenton's limitations, was disclosed by Rayman Pon in the U.S. patent application Ser. No. 08/650,631, entitled "Suppression Of Multipath Signal Effects" (patent application #1), that was assigned to the assignee of the present patent application, and that was filed on May 20, 1996 and now patented U.S. Pat. No. 5,903,597. The patent application #1 is specifically referred to in the present patent application and is incorporated herein by reference. In the patent application #1 the weighted tracking process was used in order to suppress the multipath error signal, wherein the Early and Late signals were non-uniformly weighted in order to suppress the multipath error signal.

One more example of such technique for code multipath reduction was disclosed by Rayman Pon in the U.S. patent application Ser. No. 08/783,616 entitled "Code Multipath Reduction Using Optimized Additional Signals" (patent application #2) filed on Jan. 14, 1997. The patent application #2 assigned to the assignee of the present patent application, is specifically referred to in the present patent application and is incorporated herein by reference. In the patent application #2 the modified tracking process was used for the purposes of the multipath error signal suppression, wherein the Early and Late signals were modified to suppress the multipath error signal.

The code multipath reduction was based on the utilization of weighted correlation means (in application #1) or modified correlation means (in application #2) that changed the magnitude and shape of the composite signal autocorrelation function to suppress the contributions of a multipath signal. However, although the multipath signal is suppressed, the residual multipath component signal was still present in the composite signal.

One technique for estimation and minimization of the residual code multipath error signals for small delays was disclosed by Rayman Pon in the U.S. patent application Ser. No. 08/683,859 entitled "Code Multipath Error Estimation Using Weighted Correlations" (patent application #3) that was assigned to the assignee of the present patent application, and that was filed on Jul. 19, 1996 and now patented U.S. Pat. No. 5,966,403. The patent application #3 is specifically referred to in the present patent application and is incorporated herein by reference.

The patent application #3 discloses the invention that is very different from the Fenton patent.

(1) Indeed, in the patent application #3 only code tracking is performed. However, a multipath blimp left in the correlation function after code tracking can be removed by using an additional circuitry, as disclosed in the current patent application. See discussion below.

(2) The patent application #3 employs a partial weighted correlation function that is partially non-zero during one chip time period.

(3) The patent application #3 employs the "broad correlator" approach including an (E–L) response function that is not limited to one chip time period and can be extended up to two chip time periods.

(4) Using the filter function approach, the "broad correlator" property of the device of the patent application #3 can be described as follows: the amplitude of the filter function of the patent application #3 is flat and does not change when time increases between zero and two chip time periods.

SUMMARY

In the present patent application one additional technique for estimation and minimization of the residual code multipath error signals for small delays is disclosed. The current patent application employs the "broad correlator" approach.

One aspect of the present invention is directed to an apparatus for use in decoding a composite signal, wherein the composite signal includes a signal from a transmitter and a distortion component.

In one embodiment, the transmitter includes a GPS satellite system. In this embodiment, the distortion signal includes a multipath error signal.

The apparatus includes a receiving circuit configured to receive the composite signal and at least one additional circuit. The code receiving circuit generates a code receiving function having a residual multipath error response envelope. Each additional circuit is configured to generate an additional signal used to estimate and minimize the residual multipath error response envelope.

There are three basic embodiments for the receiving circuit: weighted, modified, and mixed.

In each basic embodiment, the receiving circuit further comprises at least two partial receiving circuits.

In the weighted embodiment, at least one partial code receiving circuit further comprises a weighted partial receiving circuit configured to provide a satellite partial code receiving function with reduced multipath error.

In the modified embodiment, at least one partial code receiving circuit further includes a modified partial receiving circuit configured to provide a satellite partial code receiving function with reduced multipath error.

In the mixed embodiment, one partial code receiving circuit has a weighted embodiment and one partial code receiving circuit has a modified embodiment.

Each weighted or modified partial code receiving circuit can have five additional embodiments.

In the first weighted (or modified) embodiment, at least one partial receiving circuit further comprises an (I & Q) input weighted (or modified) partial circuit configured to process the input composite signal from the satellite and to generate a weighted (or modified) partial component of the input (I & Q) composite signal.

In the second weighted (or modified) embodiment, at least one partial receiving circuit further comprises an (I & Q) weighted (or modified) partial local carrier reference circuit configured to generate an (I & Q) weighted (or modified) partial component of a local carrier reference signal.

In the third weighted (or modified) embodiments, at least one partial receiving circuit further comprises a complex mixer weighted (or modified) partial circuit configured to generate an inphase (I) weighted (or modified) partial component of a baseband sampled composite signal.

In the fourth weighted (or modified) embodiment, at least one partial receiving circuit further comprises a Local code weighted (or modified) partial reference circuit configured to locally generate a Local code weighted (or modified) partial reference signal.

In the fifth weighted (or modified) embodiment, at least one partial receiving circuit further comprises a Local weighted (or modified) partial code correlation circuit configured to generate a Local weighted (or modified) partial component of a composite correlation signal.

Each additional circuit can be implemented in five weighted or in five modified embodiments in the same way as a partial receiving circuit can be implemented.

BRIEF DESCRIPTION OF THE DRAWINGS

FIG. 1 depicts the general diagram of the apparatus of the present invention.

FIG. 2 shows a general residual multipath error response envelope obtained from weighted or modified correlation tracking.

FIG. 3 illustrates the right side of two general autocorrelation functions that can be used for the purposes of the residual multipath error function estimation.

FIG. 4A shows the correlation response at the tracking point for the two autocorrelation functions as a function of the multipath delay, wherein a multipath component has an amplitude of "g" times the direct signal.

FIG. 4B illustrates a curve (CORR #2−CORR #1).

FIG. 4C depicts a normalized curve (CORR #2−CORR #1)/CORR #1.

FIG. 4D shows a curve [(CORR #2−CORR #1)/CORR #1−(S/R−1)].

FIG. 5 depicts signals associated with the weighted correlation tracking.

FIG. 6 shows signals associated with the modified correlation tracking.

FIG. 7 illustrates the comparison of the residual multipath errors from the two tracking methods.

FIG. 8 depicts a weighted input signal embodiment.

FIG. 9 shows a modified input signal embodiment.

FIG. 10 illustrates a weighted local carrier signal embodiment.

FIG. 11 shows a modified local carrier signal embodiment.

FIG. 12 illustrates a weighted carrier mixed signal embodiment.

FIG. 13 depicts a modified carrier mixed signal embodiment.

FIG. 14 shows a weighted local code reference signal embodiment.

FIG. 15 depicts a modified local code reference signal embodiment.

FIG. 16 illustrates a weighted correlated signal embodiment.

FIG. 17 shows a modified correlated signal embodiment.

FIG. 18 depicts the generator of enabling signals in the weighted estimation for weighted tracking embodiment.

FIG. 19 shows the signals generated by the circuitry of FIG. 18.

FIG. 20 depicts the generator of enabling signals in the weighted estimation for modified tracking embodiment.

FIG. 21 illustrates the signals generated by the circuitry of FIG. 20.

FIG. 22 depicts the generator of enabling signals in the modified estimation for weighted tracking embodiment.

FIG. 23 illustrates the signals generated by the circuitry of FIG. 22.

FIG. 24 depicts the signals generated by the circuitry of FIG. 22.

FIG. 25 shows the generator of enabling signals in the modified estimation for modified tracking embodiment.

FIG. 26 illustrates the signals generated by the circuitry of FIG. 25.

FIG. 27 depicts the CORR #1 and CORR #2 signals obtained by using weighted or modified additional signals for weighted tracking embodiment.

FIG. 28 shows the CORR #1 and CORR #2 signals obtained by using weighted or modified additional signals for modified tracking embodiment.

FULL DESCRIPTION OF THE PREFERRED EMBODIMENT

FIG. 1 shows the general block diagram (10) of the current invention. In one embodiment, the transmitter comprises the SATPS satellite system. In this embodiment, a receiving circuit (14) comprises a satellite receiving circuit.

The receiving circuit (14) can use either weighted or modified code tracking process to provide code tracking with reduced multipath error signal. In general the receiving circuit comprises at least two partial receiving circuits (20) and (18) either of which can include a weighted or modified partial receiving circuit. It is important to underscore that the weighted tracking includes a "multiply" operation on signals, wherein the modified tracking includes an "addition" operation on signals. Therefore, the weighted correlation tracking and the modified correlation tracking are substantially different modes of the code tracking operation.

The apparatus of the present invention additionally includes an additional weighted or modified receiving circuit (16) that can be used in parallel with the main receiving circuit (14) in order to estimate and minimize the residual multipath error signal.

Partial receiving circuits (20) and (18) can be independent from each other. The additional circuit is also independent from the main tracking circuit (14). It follows, that all combinations of weighted or modified tracking or additional circuits can be used in the apparatus (10) of the present invention.

FIG. 2 shows a general residual multipath error response envelope (30) obtained from weighted or modified correlation tracking assuming an infinite bandwidth system and a multipath polarity which is in-phase with the direct signal. At zero multipath delay, the multipath error is zero. With increasing multipath delay, the multipath error increases until a delay value D1. The multipath error then decreases until a delay value D2 wherein the error is again zero and remains essentially zero for all multipath delays greater than D2. The additional receiving circuit (16) of FIG. 1 is used in the apparatus of the present invention to estimate and minimize the residual multipath error envelope (30) of FIG. 2.

FIG. 3 depicts the right side of two general autocorrelation functions (40) and (44) for the same direct signal that can be used for the purposes of the residual multipath error function estimation. FIGS. 4A–4D show how the two autocorrelation functions can be used to accurately estimate the residual multipath error signal (30) shown in FIG. 2.

FIG. 4A shows the correlation response at the tracking point for the two autocorrelation functions as a function of the multipath delay, given a multipath component amplitude of "g" times the direct signal. For example, the first correlation function CORR #1 (50) can be obtained as follows: (1) the correlation is at the tracking point, so that the direct signal contribution is R (54) and is constant for all multipath delays; (2) the response of the multipath signal is the CORR #1 curve (40) of FIG. 3 multiplied by the gain g<1; (3) using superposition, the direct (R) and multipath signal responses (gR) are added to produce the CORR #1 curve (50). The CORR #2 correlation function can be obtained in a similar fashion, wherein S is the direct signal contribution and (gS) is a multipath error at the tracking point.

FIG. 4B depicts curve (56) (CORR #2−CORR #1); FIG. 4C illustrates a normalized curve (58) (CORR #2−CORR

1)/CORR #1, and FIG. 4D shows a normalized and shifted curve (60) [(CORR #2–CORR #1)/CORR #1-(S/R 1)].

The peak value of curve (60) is equal to (S/R×g) which is linearly dependent on the multipath gain "g". The peak of the multipath residual error of FIG. 2 is also linearly dependent on the multipath gain "g". Thus, one can accurately estimate the multipath residual error of FIG. 2 using two correlation functions CORR #1 and CORR #2. Each of those correlation functions can be implemented using the weighted or modified additional circuits.

The signals associated with weighted correlation tracking and the modified correlation tracking are shown in FIG. 5 and FIG. 6 respectively. In both cases, shaping of the weighted or modified function is performed with a resolution of 1 clock period which is much smaller than 1 "chip"—the smallest time period between the pseudo random code (PRN) bit transitions.

FIG. 5 illustrates the weighted Early and Late tracking signals utilized in the patent application #1 that employs the technique of reducing the multipath error signal by utilizing weighting circuits in the standard correlation tracking channel. The shaded regions (72, 74) and (76, 78) show where the Early and Late signals respectively have a weight of 1 on a per chip basis. All other regions have a weight of 0 and are not used in the tracking process.

FIG. 6 depicts the modified Early (81) and Late (83) tracking signals used to reduce the multipath error signal.

The value of the modified (E–L) function can be made substantially identical to the value of the weighted E–L function. This result can be achieved by using the generators of additional signals to modify certain intermediate signals in the standard tracking channel in order to minimize the contribution of multipath signals. The additional signals can be generated by a generator of additional signals at different levels of the standard tracking channel to achieve the same result of minimizing the multipath signal.

Indeed, the pseudo baseband frequency of the incoming IF signal is at a certain frequency S. The local carrier numerically controlled oscillator (NCO) attempts to synthesize exactly this frequency to mix the IF signal to baseband to allow code correlation to occur. An inphase (I) signal and an out-of-phase quadrature (Q) signal are generated in this mixing process. The inphase (I) signal is used to estimate the signal power. The out-of-phase (Q) signal is used to maintain phase lock onto the satellite signal, and is maintained near zero.

The local carrier signal is generated on frequency L. When the local carrier signal is locked on the IF signal, the local signal frequency L is nearly identical to the satellite carrier frequency S without noise. By mixing the inphase and quadrature components $I_S$ and $Q_S$ of the input signal with the inphase and quadrature components of the locally generated carrier signal $I_L$ and $Q_L$, one can obtain the inphase and quadrature baseband components $I_B$ and $Q_B$ in the complex notation:

$$I_B + jQ_B = (I_S + jQ_S) \times (I_L + jQ_L) = (I_S \times I_L - Q_S \times Q_L) + j(I_S Q_L + I_L \times Q_S); \quad (1)$$

wherein $j^2 = (-1)$.

Equation (1) can be rewritten in the following way:

$$I_B = (I_S \times I_L \times Q_S \times Q_L); \quad (2)$$

and $$Q_B = (I_S \times Q_L + I_L \times Q_S); \quad (3)$$

The input signal as well as the locally generated carrier has at least a sign bit along with some magnitude bits. After the mixing process, the inphase or quadrature baseband components $I_B$ and $Q_B$ have a sign bit along with some magnitude bits, wherein the baseband number of magnitude bits is a sum of the input signal number of magnitude bits and the locally generated carrier number of magnitude bits.

After the mixing process is completed, the inphase baseband component $I_B$ is correlated with the 1 bit locally generated code, wherein 1 bit=sign bit plus zero magnitude bits. The quadrature baseband component $Q_B$ is used to close the carrier tracking loop.

For the Early and Late correlation signals, we have the following equations:

$$E \text{ correlation signal} = (E \text{ local code} \times I_B \text{ mixing}) = (E \text{ local code} \times (I_S \text{ input} \times I_L \text{ local carrier} - Q_S \text{ input} \times Q_L \text{ local carrier})); \quad (4)$$

$$L \text{ correlation signal} = (L \text{ local code} \times I_B \text{ mixing}) = (L \text{ local code} \times (I_S \text{ input} \times I_L \text{ local carrier} - Q_S \text{ input} \times Q_L \text{ local carrier})); \quad (5)$$

wherein $I_B$ signal is substituted by equation (2).

All signals in the entire processing chain involve a sign bit and zero or more magnitude bits. At the end of the processing chain, the correlated signal with sign and magnitude bits is accumulated (integrated). After some predetermined time interval of accumulation, the sum is read out to close the code and carrier loops, and the accumulator is zeroed out for the next interval.

Now, we intend to demonstrate the equivalence of modifying the following signals: input signals; locally generated carrier signals; mixed signals; Early and Late reference signals; and correlated Early and Late signals.

Equations (4) and (5) mix the input signal with a locally generated carrier signal and correlate the resulting signal with either Early or Late local code reference signal. The resulting signal is accumulated in the accumulator registers each sample clock for the entire predetermined interval period.

As was mentioned above, a drastic reduction in code multipath can be achieved by modifying the Early and Late local code reference signals at appropriate times. The modification of E and L local code signals can be achieved by logically adding using the (EX-OR) operation the additional signals A and B to the E and L unmodified local code signals in order to generate the modified $E_M$ and $L_M$ local code signals:

$$E_M = E(EX\text{-}OR)A = (-)E, \text{ only when } (A=1 \text{ or logic high at times } t=t_A); \quad (6)$$

$$L_M = L(EX\text{-}OR)B = (-)L \text{ only when } (B=1 \text{ or logic high at times } t=t_B). \quad (7)$$

Thus, the modification operation using the A and B signals is equivalent to changing the sign of E and L local code signals at appropriate times.

Thus, we have the following equations for the modified E and L correlation signals at these particular times only:

Early modified correlation signal at certain time $t_A = (-)E$ local code×$(I_S \times I_L - Q_S \times Q_L)$; (8)

Late modified correlation signal at certain time $t_B = (-)L$ local code×$(I_S \times I_L - Q_S \times Q_L)$. (9)

However, when viewing from the perspective of equations (4) and (5), changing E local code signal to (−E) local code signal and L local code signal to (−L) local code signal at appropriate times can be replaced by changing any other signal in the equations (4–5) (input, carrier, mixing, or correlation) to its negative value at appropriate times.

Thus, for modified input signals we have the following equations:

E modified correlation signal at certain time $t_A$=E local code×((−)$I_S$ input×$I_L$−(−)$Q_S$ input×$Q_L$); (8a)

L modified correlation signal at certain time $t_B$=L local code×((−)$I_S$ input×$I_L$ −(−)$Q_S$ input×$Q_L$); (9a)

For modified locally generated carrier signals we have the following equations:

E modified correlation signal at certain time $t_A$−E local code×((−)$I_L$ local carrier×$I_S$−(−)$Q_L$ local carrier×$Q_S$); (8b)

L modified correlation signal at certain time $t_B$−L local code×((−)$I_L$ local carrier×$I_S$−(−)$Q_L$ local carrier×$Q_S$). (9b)

For modified mixed signals we have the following equations:

E modified correlation signal at certain time $t_A$−E local code×(−)(($I_L$×$I_S$−$Q_L$×$Q_S$)) mixing signal; (8c)

L modified correlation signal at certain time $t_B$−L local code×(−)(($I_L$×$I_S$−$Q_L$×$Q_S$)) mixing signal. (9c)

And finally, for modified Early and Late correlation signals we have the following equations:

E modified correlation signal at certain time $t_A$=(−){E local code× ($I_L$×$I_S$−$Q_L$×$Q_S$) mixing signal}; (8d)

L modified correlation signal at certain time $t_B$=(−){L local code× ($I_L$×$I_S$−$Q_L$×$Q_S$) mixing signal}. (9d)

Mathematically, equations (8), (8a), (8b), (8c), and (8d) are identical. Also, equations (9), (9a), (9b), (9c), and (9d) are identical. However, obtaining the change in sign in each of the above given cases involves a different receiver's architecture.

Indeed, according to equations (8), (8a), (8b), (8c), (8d) and (9), (9a), (9b), (9c), (9d) the multiplication, addition, and the change of sign operation can be performed at the same time. However, in practice, each step is performed at a different clock cycle, and afterwards is pipelined. Therefore, the modification signals for any specific implementation must be either delayed or advanced so that the net resulting signals become identical to the resulting signals described by the equations (8) and (9).

In the standard signal processing configuration the sampled input signal I is mixed with the local carrier signal in the mixer which results in the downconverted baseband signal $I_B$. The local E code signal and the local L signal are combined to generate a local code signal ($\alpha$E+$\beta$L), wherein $\alpha$ and $\beta$ are real values. The local code signal ($\alpha$E+$\beta$L) is correlated with the downconverted baseband signal $I_B$ in the correlator which results in the resulting signal ($\alpha$E+$\beta$L)$I_B$.

The two tracking methods are not identical. Indeed, the minimum (Early_to_Late) separation for weighted correlation tracking is only 1 clock period as shown in FIG. 5, while for modified tracking the minimum (Early_to_Late) separation comprises at least 2 clock periods, as depicted in FIG. 6.

The residual multipath errors from the two tracking methods are slightly different, as shown in FIG. 7. The weighted correlation (92) results in the less multipath error signal as the modified correlation tracking (90).

Now we focus on the specific implementations of the apparatus of the present invention according to the general circuit (10) of FIG. 1. As was mentioned above, the receiving circuit (14) comprises two partial receiving circuits: (18) and (20). Each of these partial receiving circuits, as well as an additional circuit, can be implemented using a modified or a weighted partial receiving circuit independently.

The partial tracking satellite channel circuit (18 or 20) or an additional circuit (16) of FIG. 1 includes the following elements (see also FIG. 8): the input circuit; the local carrier generator (116); the complex mixer (108); the local reference code generator (118); the code correlator (110); the Accumulate and Dump circuit (112); and the computer (114). The functioning of each element of the standard satellite tracking channel is well known to the person of the ordinary skill in the art.

As was shown above, the equivalence of modifying the following signals: input signals; locally generated carrier signals; mixed signals; Early and Late reference signals; and correlated Early and Late signals was demonstrated.

Similarly, there is an equivalence of weighting the following signals: input signals; locally generated carrier signals; mixed signals; Early and Late reference signals; and correlated Early and Late signals.

In the first weighted embodiment of the present invention, the inphase and quadrature components (I & Q) of the input signal (104) are weighted in the block (106) as shown in FIG. 8. The weighted input signal is further mixed with the local carrier signal (116) in the complex mixer (108) which results in the downconverted baseband signal (109). The local code reference signal (118) is correlated with the downconverted baseband signal (109) in the code correlator (110). The correlation resulting signal is accumulated in the Accumulate and Dump circuit (112) and the resulting signal is fed into the computer (114).

The additional Weight signal (A or B) (102) is introduced in this embodiment at the input level. The additional signal (102) for Weight Input partial receiving circuit or an additional circuit of FIG. 8 can be implemented using a Weight Generator circuit as discussed in detail below.

FIG. 9 shows the modified input signal embodiment (130) of the partial tracking satellite channel circuit (18 or 20) of FIG. 1. This embodiment includes the same elements as the apparatus of FIG. 8 but the Weight input is replaced by Modify input (136).

In the first modified embodiment, the inphase and quadrature components (I & Q) of the input signal (104) are modified in the Modify Input block (136) as shown in FIG. 9. The modified input signal is further mixed with the local carrier signal (116) in the complex mixer (108) which results in the downconverted baseband signal (109). The local code reference signal (118) is correlated with the downconverted baseband signal (109) in the code correlator (110). The correlation resulting signal is accumulated in the Accumulate and Dump circuit (112) and the resulting signal is fed into the computer (114).

The additional Modify signal (A or B) (102) is also introduced in this embodiment at the input level. The additional signal (102) for Modify Input partial receiving circuit or an additional circuit can be implemented using a Modify Generator circuit as discussed in detail below.

In one embodiment, the reference code signals (118) or local carrier reference signals (116) can be delayed or advanced to account for processing delays in the A and B additional input circuits. See discussion below.

In another embodiment, A or B, Weight or Modify, additional signals can be delayed or advanced to account for processing delays or advances.

The computer (114) is used to close the carrier and code loops and to optimize the additional A or B signals in order to estimate and minimize the contribution of the multipath signal into the received satellite composite signal.

Thus, the current patent application employs the "broad correlator" approach including an (E−L) response function that is not limited to one chip time period and is extended up to two chip time periods.

Using the filter function approach, the device of the current patent application can be described as follows: the amplitude of the filter function of the apparatus of the current patent application is flat and does not change when time increases between zero and two chip time periods.

In the second weighted embodiment, as depicted in FIG. 10, at least one partial tracking satellite channel circuit (140) or an additional circuit is modified at the locally generated carrier level (144).

In this embodiment, the additional Weight signal (A or B) (102) is introduced at the locally generated carrier level.

The further processing of the resulting signal (109) is the same as in the first embodiment depicted in FIG. 8 and disclosed above.

The reference code signal (118) or (A or B) signals may need to be delayed or advanced (see discussion above) to account for processing delays in the (A or B) additional circuits.

In this embodiment, the computer is also used to close the carrier and code loops and to optimize the additional A or B signals in order to minimize the contribution of the multipath signal into the received satellite composite signal.

Similarly, in the second modified embodiment as shown in FIG. 11, at least one partial tracking satellite channel circuit (150) or an additional circuit is modified at the locally generated carrier level (154).

In this embodiment, the additional Modify signals (A or B) (102) are also introduced at the locally generated carrier level.

The further processing of the resulting signal (109) is the same as in the weighted local carrier reference signal embodiment of FIG. 10.

In the third weighted embodiment of the present invention, the carrier mixed signal is weighted in the Weight block (164) as shown in FIG. 12. The additional Weight signals (A or B) are introduced at the Weight carrier mixed level and are used to estimate and optimize the residual multipath error signal.

The further processing of signals in this embodiment is the same as disclosed above in relation to the second weighted embodiments of the present invention.

In the third modified embodiment of the present invention (170) as depicted in FIG. 13, the carrier mixed signal is modified in the Modify block (174). The additional Modify signals (A or B) are again introduced at the Modify carrier mixed signal level and are used to estimate and optimize the residual multipath error signal. The further processing of signals in this embodiment is the same as disclosed above in relation to the second modified embodiments of the present invention.

The fourth weighted embodiment of the present invention relates to modification of signals at the local reference code level as depicted in FIG. 14. In this embodiment, an additional Weight (A or B) signals (102) are introduced at the local code level in the block Weight Local Code (184). The further processing of signals in this embodiment is similar to the third weighted embodiment of the present invention disclosed above.

In the fourth modified embodiment of the present invention shown in FIG. 15, the additional Modify (A or B) signals (102) are introduced at the Modify Local Code level in the block (194). The further processing of the signal is disclosed above.

The fifth weighted embodiment of the present invention shown in FIG. 16 utilizes the additional Weight or Modify signals (A or B) (102) at the Weight Correlated Signal level in the block (210). The further processing is the same.

Finally, in the fifth modified embodiment (220) of the present invention as depicted in FIG. 17, the additional Weight or Modify signals (A or B) are introduced at the Modify Correlated Signal level in the block (230).

As was explained above, the weighted or modified additional circuit 16 of FIG. 1 includes a Generator circuit that, in each of the five weighted or modified embodiments for the partial receiving circuit or for an additional circuit, generates the (A or B), Weight or Modify, additional signals.

In the first embodiment, the Weight signals (A or B) are used in the additional circuit to estimate and minimize the residual multipath signals of the weighted or modified tracking circuit.

As an example, we discuss the situation wherein the weighted additional or partial tracking circuit of FIG. 16 utilizes the additional Weight signals (A or B) at the correlation level. The remaining four situation wherein the weighted tracking is introduced at input, carrier, carrier mixer, and local code levels are treated similarly.

In one embodiment ("weighted additional signals for weighted tracking"), as illustrated in FIG. 5, the additional Weight signals introduce the non-zero weight of 1 in the areas A1 (72) and B1 (76).

Region A1 can be obtained by enabling a correlator for only one clock period following a transition on the Early signal, to provide CORR #1 function of FIG. 3. Region B1 can be obtained by enabling a correlator for only one clock period following a transition on the Late signal to provide CORR #2 function of FIG. 3.

The circuitry (230) is shown in FIG. 18. Code NCO & Generator (240) is configured to generate a local code signal. The C flip-flop (250) generates a C signal (320 of FIG. 19A), wherein the D flip-flop (260) generates a D signal (330 of FIG. 19B).

The first EX-OR gate (280) gates C and D signals to generate an enabling additional A signal (340 of FIG. 19C), wherein the second EX-OR gate (290) gates D and F signals to generate an enabling B signal (350 of FIG. 19D).

In the second embodiment ("weighted additional signals for modified tracking"), the Weight signals (A or B) are used in the additional circuit to estimate and minimize the residual multipath signals of the modified tracking circuit.

As an example, we discuss the situation wherein the modified partial tracking or the additional circuit of FIG. 17 utilizes the additional Modify signals (A or B) at the correlation level.

In this embodiment, region A3 (82) of FIG. 6 can be obtained by enabling a correlator for two clock periods following a transition on the Early signal, to provide CORR #1 function of FIG. 3. Region B3 (84) can be obtained by enabling a correlator for only one clock period following a transition on the Late signal to provide CORR #2 function of FIG. 3.

FIG. 20 illustrates the circuitry (360). Code NCO & Generator (370) is configured to generate a local code signal. The C flip-flop (380) generates a C signal (385 of FIG. 21A), wherein the F flip-flop (400) (after one additional flip-flop D to provide for two clock periods) generates an F signal (405 of FIG. 21C). The G flip-flop (410) provides the G signal (415) (not shown).

The first EX-OR gate (420) gates C and F signals to generate an enabling additional A signal (440 of FIG. 21D), wherein the second EX-OR gate (430) gates F and G signals to generate an enabling B signal (450 of FIG. 21E).

In the third embodiment, the modified additional signals are used in an additional circuit to obtain the appropriate CORR #1 (900 of FIG. 27) and CORR #2 (910 of FIG. 27) to estimate and minimize the residual multipath error signals resulting from the weighted tracking process.

The circuitry is shown in FIG. 22. The code NCO & Generator (510) generates a local code signal. The G flip-flop (520), the H flip-flop (530), the Early flip-flop (540), the Punctual flip-flop (550), the Late flip-flop (560), the K flip-flop (570), the M flip-flop (580),the Z flip-flop (590), the W flip-flop (600), the T flip-flop (610), the X flip-flop (630), and the Y flip-flop (640) generate the respective signals.

The first AND gate (650) gates the Y, T and W signals to generate an enabling (A) additional signal (650 of FIG. 24A), wherein the second AND gate (660) gates the Z and Y signals to generate an enabling (B) additional signal (660 of FIG. 24B).

Finally, in the fourth embodiment, the modified additional signals are used in an additional circuit to obtain the appropriate CORR #1 (920 of FIG. 28) and CORR #2 (930 of FIG. 28) to estimate and minimize the residual multipath error signals resulting from the modified tracking process.

The circuitry is shown in FIG. 25. The code NCO & Generator (680) generates a local code signal. The G flip-flop (690), the H flip-flop (700), the Early flip-flop (710), the Punctual flip-flop (720), the Late flip-flop (730), the K flip-flop (740), the M flip-flop (750), the Z flip-flop (760), the W flip-flop (770), the X flip-flop (790), and the Y flip-flop (800) generate the respective signals.

The first AND gate (810) gates the Y and W signals to generate an enabling (A) additional signal (830 of FIG. 26A), wherein the second AND gate (820) gates the Z and Y signals to generate an enabling (B) additional signal (840 of FIG. 26B).

The present invention also discloses the method for decoding a composite signal including a transmitter signal and a multipath distortion component.

In one embodiment, the method comprises the steps of: (1) receiving the satellite signal by a receiving circuit, wherein the receiving circuit reduces the multipath error signal; (2) generating at least one additional signal by an additional circuit, wherein at least one additional signal is used to estimate the reduced multipath signal; and (3) minimizing the reduced multipath error signal further by optimizing at least one additional signal by a computer.

In one embodiment, the step of receiving the satellite signal by a receiving circuit further comprises the step of generating a code weighted receiving function having a residual multipath error response envelope.

In another embodiment, the step of receiving said satellite signal by a receiving circuit further comprises the step of generating a code modified receiving function having a residual multipath error response envelope.

Yet, in one more embodiment, the step of generating at least one additional signal by the additional circuit further comprises the step of generating an additional code weighted receiving function, wherein the additional code weighted receiving function is used to estimate the reduced multipath signal.

In an additional embodiment, the step of generating at least one additional signal by the additional circuit further comprises the step of generating an additional code modified receiving function, wherein the additional code modified receiving function is used to estimate the reduced multipath signal.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An apparatus for use in decoding a composite signal, wherein said composite signal includes a signal from a transmitter and a distortion component, said apparatus comprising:
    a receiving circuit configured to receive said composite signal; said receiving circuit further comprising:
        at least two partial code receiving circuits; and
        at least one additional circuit connected to said receiving circuit;
        wherein each said code receiving circuit generates a code receiving function having a residual multipath error response envelope; and
        wherein each said additional circuit is configured to generate an additional signal; and
        wherein each said additional signal is used to estimate and minimize said residual multipath error response envelope.

2. The apparatus of claim 1, wherein said transmitter includes at least one communication satellite, wherein said composite signal includes a direct signal transmitted from at least one said satellite and a multipath distortion component; and wherein each said receiving circuit comprises:
    a satellite channel code receiving circuit configured to reduce said multipath distortion component; said satellite channel code receiving circuit further comprising:
        at least two satellite partial code receiving circuits;
        wherein said satellite channel code receiving circuit generates a satellite code receiving function having a residual multipath error response envelope; and
        wherein each said additional circuit is configured to estimate and eliminate said satellite code receiving function having a residual multipath error response envelope.

3. The apparatus of claim 2; wherein at least one said partial code receiving circuit further comprises:
    a weighted partial code receiving circuit configured to provide a satellite partial code receiving function with reduced multipath error.

4. The apparatus of claim 2; wherein at least one said partial code receiving circuit further comprises:
    a modified partial code receiving circuit configured to provide a satellite partial code receiving function with reduced multipath error.

5. The apparatus of claim 2; wherein at least one said additional circuit further comprises:
    a weighted code estimation circuit configured to estimate and eliminate said residual multipath distortion component.

6. The apparatus of claim 2; wherein at least one said additional circuit further includes:
    a modified code estimation circuit configured to estimate and eliminate said residual multipath distortion component.

7. The apparatus of claim 3; wherein said weighted partial receiving circuit further comprises:
    an (I & Q) input weighted partial code circuit configured to process said input composite signal from said satellite and to generate a weighted partial component of said input (I & Q) composite signal.

8. The apparatus of claim 4; wherein said modified partial code receiving circuit further comprises:
    an (I & Q) input modified partial circuit configured to process said input composite signal from said satellite and to generate a modified partial component of said (I & Q) input composite signal.

9. The apparatus of claim 3; wherein said weighted partial code receiving circuit further comprises:
   an (I & Q) weighted partial local carrier reference circuit configured to generate an (I & Q) weighted partial component of a local carrier reference signal.

10. The apparatus of claim 4; wherein said modified partial code receiving circuit further comprises:
    an (I & Q) modified partial local carrier reference circuit configured to generate an (I & Q) modified partial component of a local carrier reference signal.

11. The apparatus of claim 3; wherein said weighted partial code receiving circuit further comprises:
    a complex mixer weighted partial circuit configured to generate an inphase (I) weighted partial component of a baseband sampled composite signal.

12. The apparatus of claim 4; wherein said modified partial code receiving circuit further comprises:
    a complex mixer modified partial circuit configured to generate an inphase (I) modified partial component of a baseband sampled composite signal.

13. The apparatus of claim 3; wherein said weighted partial code receiving satellite channel circuit further comprises:
    a Local code weighted partial reference circuit configured to locally generate a Local code weighted partial reference signal.

14. The apparatus of claim 4; wherein said modified partial code receiving satellite channel circuit further comprises:
    a Local code modified partial reference circuit configured to locally generate a Local code modified partial reference signal.

15. The apparatus of claim 3; wherein said weighted partial code receiving satellite channel circuit further comprises:
    a Local weighted partial code correlation circuit configured to generate a Local weighted partial component of a composite correlation signal.

16. The apparatus of claim 4; wherein said modified partial code receiving satellite channel circuit further comprises:
    a Local modified partial code correlation circuit configured to generate a Local modified partial component of a composite correlation signal.

17. The apparatus of claim 5; wherein said weighted code estimation circuit configured to estimate and eliminate said residual multipath distortion component further comprises:
    an (I & Q) input weighted circuit configured to process said input composite signal from said satellite and to generate an additional (I & Q) weighted component of said input composite signal.

18. The apparatus of claim 6; wherein said modified code estimation circuit configured to estimate and eliminate said residual multipath distortion component further comprises:
    an (I & Q) input modified circuit configured to process said input composite signal from said satellite and to generate an additional (I & Q) modified component of said input composite signal.

19. The apparatus of claim 5; wherein said weighted code estimation circuit configured to estimate and eliminate said residual multipath distortion component further comprises:
    an (I & Q) weighted local carrier reference circuit configured to generate an additional (I & Q) weighted component of a local carrier reference signal.

20. The apparatus of claim 6; wherein said modified code estimation circuit configured to estimate and eliminate said residual multipath distortion component further comprises:
    an (I & Q) modified local carrier reference circuit configured to generate an additional (I & Q) modified component of a local carrier reference signal.

21. The apparatus of claim 5; wherein said weighted code estimation circuit configured to estimate and eliminate said residual multipath distortion component further comprises:
    a complex mixer weighted circuit configured to generate an additional inphase (I) weighted component of a baseband sampled composite signal.

22. The apparatus of claim 6; wherein said modified code estimation circuit configured to estimate and eliminate said residual multipath distortion component further comprises:
    a complex mixer modified circuit configured to generate an additional inphase (I) modified component of a baseband sampled composite signal.

23. The apparatus of claim 5; wherein said weighted code estimation circuit configured to estimate and eliminate said residual multipath distortion component further comprises:
    a Local code weighted reference circuit configured to locally generate an additional Local code weighted reference signal.

24. The apparatus of claim 6; wherein said modified code estimation circuit configured to estimate and eliminate said residual multipath distortion component further comprises:
    a Local code modified reference circuit configured to locally generate an additional Local code modified reference signal.

25. The apparatus of claim 5; wherein said weighted code estimation circuit configured to estimate and eliminate said residual multipath distortion component further comprises:
    a Local weighted code correlation circuit configured to generate an additional Local weighted component of a composite correlation signal.

26. The apparatus of claim 6; wherein said modified code estimation circuit configured to estimate and eliminate said residual multipath distortion component further comprises:
    a Local modified code correlation circuit configured to generate an additional Local modified component of a composite correlation signal.

27. The apparatus of claim 5; wherein said weighted code estimation circuit configured to estimate and eliminate said residual multipath distortion component further comprises:
    a code NCO & Generator configured to generate a local code signal;
    a C flip-flop connected to said code NCO & Generator, wherein said C flip-flop is configured to generate a C signal;
    a D flip-flop connected to said C flip-flop, wherein said D flip-flop is configured to generate a D signal;
    an F flip-flop connected to said D flip-flop, wherein said F flip-flop is configured to generate an F signal;
    a first EX-OR gate connected to said C flip-flop and connected to said D flip-flop, wherein said first EX-OR gate is configured to generate an enabling (A) additional signal; and
    a second EX-OR gate connected to said D flip-flop and connected to said F flip-flop, wherein said second EX-OR gate is configured to generate an enabling (B) additional signal.

28. The apparatus of claim 5; wherein said weighted code estimation circuit configured to estimate and eliminate said residual multipath distortion component further comprises:

a code NCO & Generator configured to generate a local code signal;

a C flip-flop connected to said code NCO & Generator, wherein said C flip-flop is configured to generate a C signal;

a D flip-flop connected to said C flip-flop, wherein said D flip-flop is configured to generate a D signal;

an F flip-flop connected to said D flip-flop, wherein said F flip-flop is configured to generate an F signal;

a G flip-flop connected to said F flip-flop, wherein said G flip-flop is configured to generate a G signal;

a first EX-OR gate connected to said C flip-flop and connected to said F flip-flop, wherein said first EX-OR gate is configured to generate an enabling (A) additional signal; and a second EX-OR gate connected to said F flip-flop and connected to said G flip-flop, wherein said second EX-OR gate is configured to generate an enabling (B) additional signal.

29. The apparatus of claim 6; wherein said modified code estimation circuit configured to estimate and eliminate said residual multipath distortion component further comprises:

a code NCO & Generator configured to generate a local code signal;

an G flip-flop connected to said code NCO & Generator, wherein said G flip-flop is configured to generate an G signal;

a H flip-flop connected to said G flip-flop, wherein said H flip-flop is configured to generate a H signal;

an Early flip-flop connected to said H flip-flop, wherein said Early flip-flop is configured to generate an Early signal;

a Punctual flip-flop connected to said Early flip-flop, wherein said Punctual flip-flop is configured to generate a Punctual signal;

a Late flip-flop connected to said Punctual flip-flop, wherein said Late flip-flop is configured to generate a Late signal;

an EX-OR gate connected to said A flip-flop and connected to said B flip-flop;

an X flip-flop connected to said EX-OR gate, wherein said X flip-flop is configured to generate an X signal;

a Y flip-flop connected to said X flip-flop, wherein said Y flip-flop is configured to generate a Y signal;

an K flip-flop connected to said code NCO & Generator, wherein said K flip-flop is configured to generate an K signal;

an M flip-flop connected to said K flip-flop, wherein said M flip-flop is configured to generate an M signal;

a Z flip-flop connected to said M flip-flop, wherein said Z flip-flop is configured to generate a Z signal;

a W flip-flop connected to said Z flip-flop, wherein said W flip-flop is configured to generate a W signal;

a first AND gate connected to said Y flip-flop and connected to said W flip-flop, wherein said first AND gate is configured to generate an enabling (A) additional signal; and a second AND gate connected to said Y flip-flop and connected to said Z flip-flop, wherein said second AND gate is configured to generate an enabling (B) additional signal.

30. The apparatus of claim 6; wherein said modified code estimation circuit configured to estimate and eliminate said residual multipath distortion component further comprises:

a code NCO & Generator configured to generate a local code signal;

an G flip-flop connected to said code NCO & Generator, wherein said G flip-flop is configured to generate an G signal;

a H flip-flop connected to said G flip-flop, wherein said H flip-flop is configured to generate an H signal;

an Early flip-flop connected to said H flip-flop, wherein said Early flip-flop is configured to generate an Early signal;

a Punctual flip-flop connected to said Early flip-flop, wherein said Punctual flip-flop is configured to generate a Punctual signal;

a Late flip-flop connected to said Punctual flip-flop, wherein said Late flip-flop is configured to generate a Late signal;

an EX-OR gate connected to said A flip-flop and connected to said B flip-flop;

an X flip-flop connected to said EX-OR, wherein said X flip-flop is configured to generate an X signal;

a Y flip-flop connected to said X flip-flop, wherein said Y flip-flop is configured to generate a Y signal;

an K flip-flop connected to said code NCO & Generator, wherein said K flip-flop is configured to generate an K signal;

an M flip-flop connected to said K flip-flop, wherein said M flip-flop is configured to generate an M signal;

a Z flip-flop connected to said M flip-flop, wherein said Z flip-flop is configured to generate a Z signal;

a W flip-flop connected to said Z flip-flop, wherein said W flip-flop is configured to generate a W signal;

a T flip-flop connected to said W flip-flop, wherein said T flip-flop is configured to generate a T signal;

a first AND gate connected to said Y flip-flop, connected to said T flip-flop, and connected to said W flip-flop, wherein said first AND gate is configured to generate an enabling (A) additional signal; and a second AND gate connected to said Y flip-flop and connected to said Z flip-flop, wherein said second AND gate is configured to generate an enabling (B) additional signal.

31. A method for decoding a composite signal including a transmitter signal and a multipath distortion component, said method comprising the steps of:

receiving said transmitter signal by a receiving circuit, wherein said receiving circuit is configured to reduce said multipath distortion component;

generating at least one additional signal by an additional circuit, wherein at least one said additional signal is used to estimate said reduced multipath signal; and minimizing said reduced multipath distortion component by optimizing at least one said additional signal by a computer.

32. A method for decoding a composite signal including a satellite signal and a multipath distortion component, said method comprising the steps of:

receiving said satellite signal by a receiving circuit, wherein said receiving circuit is configured to reduce said multipath distortion component;

generating at least one additional signal by an additional circuit, wherein at least one said additional signal is used to estimate said reduced multipath signal; and minimizing said reduced multipath distortion component by optimizing at least one said additional signal by a computer.

33. The method of claim 32; wherein said step of receiving said satellite signal by a receiving circuit further comprises the step of:

generating a code weighted receiving function having a residual multipath error response envelope.

34. The method of claim 32; wherein said step of receiving said satellite signal by a receiving circuit further comprises the step of:

generating a code modified receiving function having a residual multipath error response envelope.

35. The method of claim 32; wherein said step of generating at least one additional signal by said additional circuit further comprises the step of:

generating an additional code weighted receiving function, wherein said additional code weighted receiving function is used to estimate said reduced multipath signal.

36. The method of claim 32; wherein said step of generating at least one additional signal by said additional circuit further comprises the step of:

generating an additional code modified receiving function, wherein said additional code modified receiving function is used to estimate said reduced multipath signal.

* * * * *